US008831204B1

(12) United States Patent
Pycko et al.

(10) Patent No.: US 8,831,204 B1
(45) Date of Patent: Sep. 9, 2014

(54) PROTECTING SENSITIVE INFORMATION PROVIDED BY A PARTY TO A CONTACT CENTER

(71) Applicant: Noble Systems Corporation, Atlanta, GA (US)

(72) Inventors: Marcin Pycko, Madison, AL (US); Ruby A. Fields, Smyrna, GA (US); Karl H. Koster, Sandy Springs, GA (US)

(73) Assignee: Noble Systems Corporation, Atlanta, GA (US)

( * ) Notice: Subject to any disclaimer, the term of this patent is extended or adjusted under 35 U.S.C. 154(b) by 0 days.

(21) Appl. No.: 13/861,102

(22) Filed: Apr. 11, 2013

(51) Int. Cl.
*H04M 3/00* (2006.01)
*H04M 3/22* (2006.01)

(52) U.S. Cl.
CPC ...................................... *H04M 3/22* (2013.01)
USPC ................ 379/265.02; 379/88.18; 379/93.02; 379/283

(58) Field of Classification Search
None
See application file for complete search history.

(56) References Cited

U.S. PATENT DOCUMENTS

| 5,267,305 | A | 11/1993 | Prohs et al. | |
|---|---|---|---|---|
| 6,862,343 | B1 * | 3/2005 | Vacek et al. | 379/88.22 |
| 7,974,411 | B2 | 7/2011 | Krishnapuram et al. | |
| 8,275,115 | B1 * | 9/2012 | Everingham et al. | 379/265.02 |
| 2006/0050658 | A1 * | 3/2006 | Shaffer et al. | 370/261 |
| 2010/0161990 | A1 * | 6/2010 | Statham et al. | 713/172 |
| 2011/0228919 | A1 * | 9/2011 | Tew et al. | 379/93.12 |
| 2012/0140911 | A1 * | 6/2012 | Johansen et al. | 379/93.02 |

OTHER PUBLICATIONS

Asterisk DTMF, Voip=Info.o—A Reference Guide to All Things VoIP, four pages, retrieved on Mar. 18, 2013 from www.voip-info.org/wiki/view/Asterosk+DTMF.
Schulzerinne, H; Taylor, T; Request for Comments 4733 ("RFC 4733"), RTP Payload for DTMF Digits, Telephony Tones, and Telephony Signals, The IETF Trust, Dec. 2006, 46 pages, U.S.
Donovan, S; Request for Comments 2976 ("RFC 2976"), The SIP INFO Method; The Internet Society, Oct. 2000, 9 pages, U.S.
Burger, E.; Dolly, M; Request for Comments 4730 ("RFC 4730"), A Session Initiation Protocol (SIP) Event Package for Key Press Stimulus (KPML), The Internet Society, Nov. 2006, 56 pages, U.S.
Homberg, C; Burger, E; Kaplan, H.; Request for Comments 6086 ("RFC 6086"), Session Initiation Protocol (SIP) Info Method and Package Framework, Internet Engineering Task Force, Jan. 2011, 36 pages, U.S.
Kuthan, Jiri; Sisalem, Dorgham; SIP: More Than You Ever Wanted to Know About; Powerpoint Presentation, Mar. 2007, 242 pages, Tekelec, U.S.
Schulzrinne, H; Petrack, S; Request for Comments 2833 ("RFC 2833"); RTP Payload for DTMF Digits, Telephony Tones, and Telephony Signals, The Internet Society, May 2000, 29 pages, U.S.

* cited by examiner

*Primary Examiner* — Duc Nguyen
*Assistant Examiner* — Assad Mohammed

(57) ABSTRACT

A secure three-way bridge in a SIP-based processing switch protects sensitive information provided by a party during a call with an agent in a contact center. During the call, the agent may bridge an interactive voice response system ("IVR") onto the call using the secure three-way bridge so that the party can enter sensitive information, such as a credit card account, to the IVR. The information is provided by the party using dual-tone multiple frequency ("DTMF") tones that are presented in an unmodified form to the IVR, but modified and then presented to the agent, so that the agent is unable to discern the sensitive information provided by the party. Other embodiments may accomplish similar capabilities by application of components outside of the bridging structure. Further, recording systems may record the call comprising the modified audio, thus protecting the sensitive information from subsequent detection upon review of the recording.

20 Claims, 22 Drawing Sheets

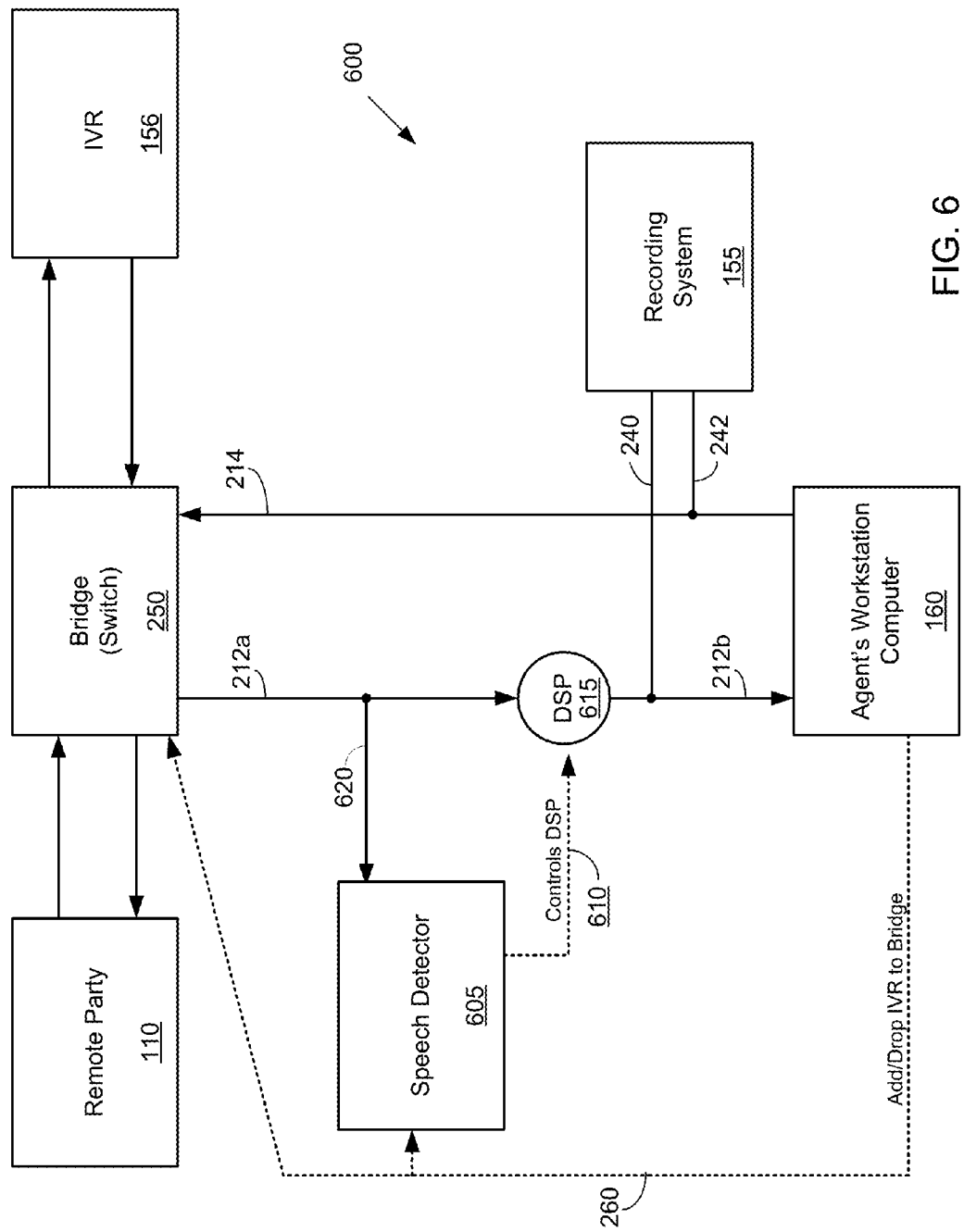

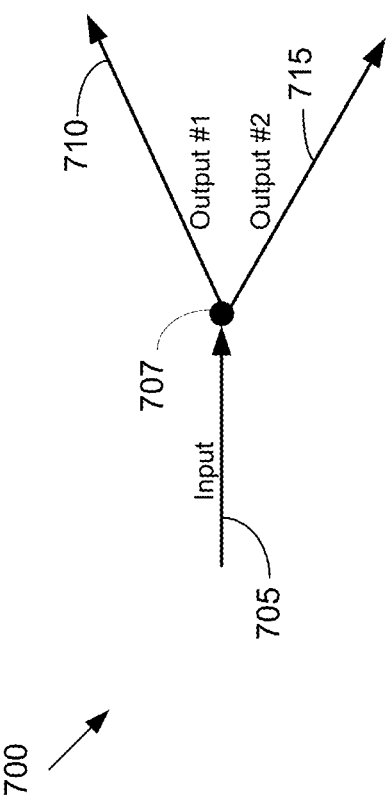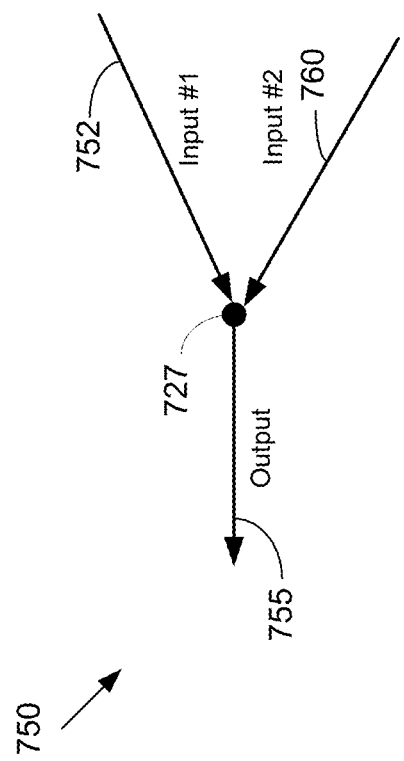

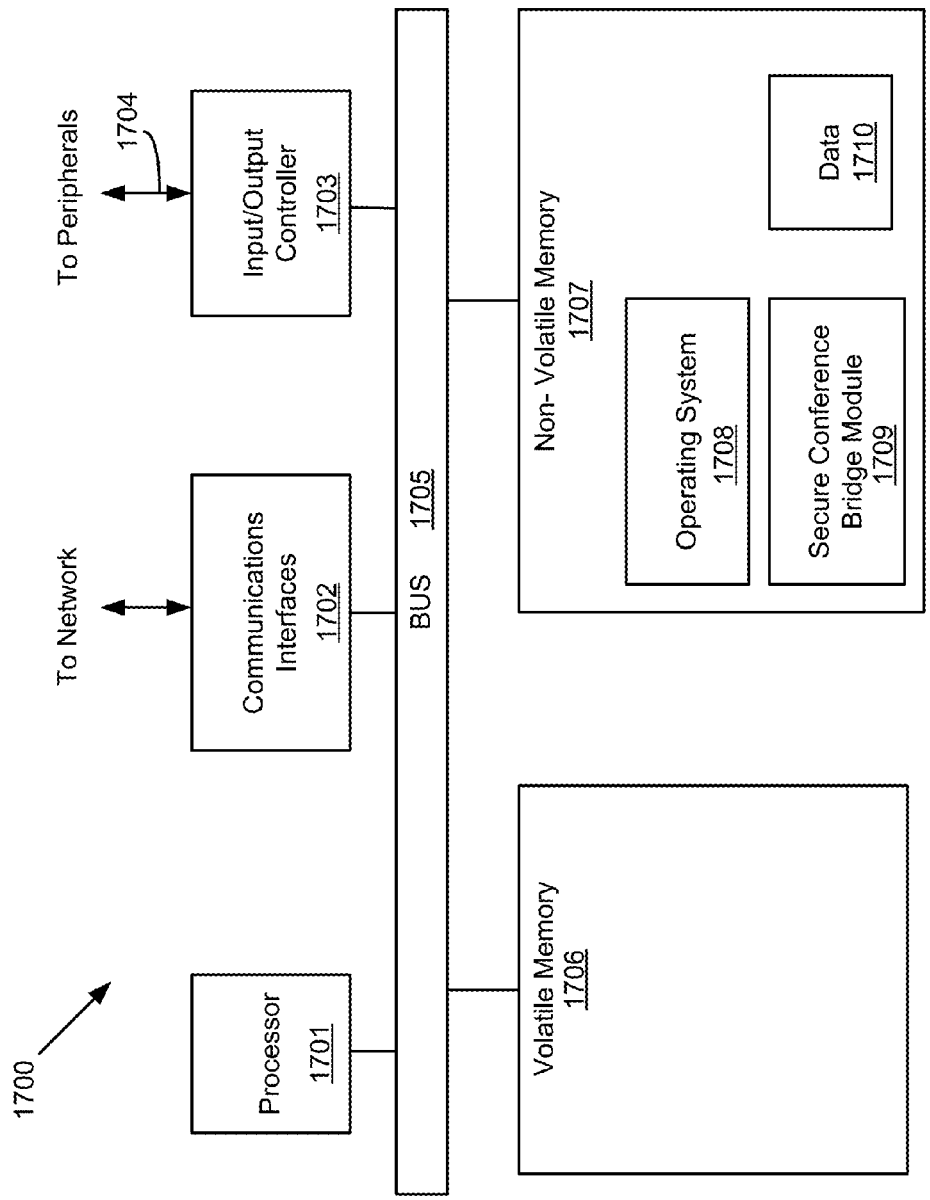

PROTECTING SENSITIVE INFORMATION PROVIDED BY A PARTY TO A CONTACT CENTER

BACKGROUND

Contact centers are frequently used by businesses to provide customer service functions, such as accepting orders for goods purchased or contacting delinquent account holders for payment. In many instances, a party will provide payment by credit card for the goods purchased or as a payment for an amount past due. Typically, this involves the party entering a credit card account number using the keys on their telephone. The information may be received by an interactive voice response system in a payment processing system. The resulting generated dual-tone multiple frequency ("DTMF") tones (a.k.a. touch-tones®) are processed by a payment processing system to effect the charge against the credit card. In some instances, the interactive voice response system may be bridged midway during the call by the agent when it is determined the remote party desired to pay. In some arrangements, the agent may hear the entire interaction between the party and the interactive voice response system, including the credit card information.

Credit card information is considered sensitive information, and the party providing the information typically desires to carefully control its dissemination. It is widely recognized that credit card information, along with other personal information, is commonly stolen for nefarious purposes. Thus, if the interactive voice response system is bridged onto the call, then the agent will hear the party's credit card account number and other sensitive information. Though uncommon, the agent could potentially use or sell this sensitive information for nefarious purposes. For security purposes, it is desirable to avoid any unnecessary exposure of the customer's sensitive information.

Further, in some applications, a recording of the call may be made for various purposes. A common purpose is to be able to subsequently verify the transaction between the agent and the party should a subsequent issue arise. In some arrangements, the recording may record not only the voice conversation, but also the DTMF tones corresponding to the sensitive information provided by the party when interacting with automated systems. The recording may be stored on a server, and potentially accessible over the Internet. Anecdotal stories of computer files that are "hacked" (i.e., stolen) leads to the possibility that sensitive information provided by the caller on a call recording could be misappropriated and compromised at a later date.

Thus, it is desirable to facilitate secure transfer of sensitive information between a remote party and an automated processing system in a contact center while maintaining the integrity of the sensitive information to the systems that process it. Specifically, the availability of sensitive information should be suppressed to the agent or in call recordings. It is with respect to these and other considerations that the disclosure herein is presented.

BRIEF SUMMARY

In general, embodiments of the present invention provide computer program products, methods, systems, apparatus, and computing entities for protecting sensitive information provided by a party. Specifically, embodiments ensure that agents and/or call recording equipment in a contact center do not hear or record sensitive information provided by the remote party.

In one embodiment, sensitive information comprises DTMF tones provided by the remote party. In one embodiment, the DTMF tones could convey credit card account information to a payment processing system. The payment processing system may incorporate an interactive voice response ("IVR") system to prompt the party to provide the credit card account information. An agent handling the call may conference or bridge the IVR onto the call. In one embodiment, any DTMF tones provided by the party are provided to the IVR, but not to the agent and/or a recording system. In another embodiment, any DTMF tones provided by the party are modified in some form and provided to the agent and/or recording system, but the modified tones are not provided to the payment processing system.

As is discussed in greater detail below, the subject matter disclosed herein may be implemented as a computer-controlled apparatus, a method, a computing system, or as an article of manufacture such as a tangible computer-readable storage medium. These and various other features will be apparent from the following Detailed Description and the associated drawings.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE SEVERAL VIEWS OF THE DRAWINGS

Reference will now be made to the accompanying drawings, which are not necessarily drawn to scale, and wherein:

FIG. 2B through FIG. 6 illustrate various embodiments for suppressing sensitive information provided by a party to an agent and/or recording system.

FIGS. 7A and 7B illustrate a splitter function and combiner function in an audio switch.

FIG. 17 illustrates one embodiment of a processing system for implementing the concepts and technologies disclosed herein.

DETAILED DESCRIPTION

Figure 1:
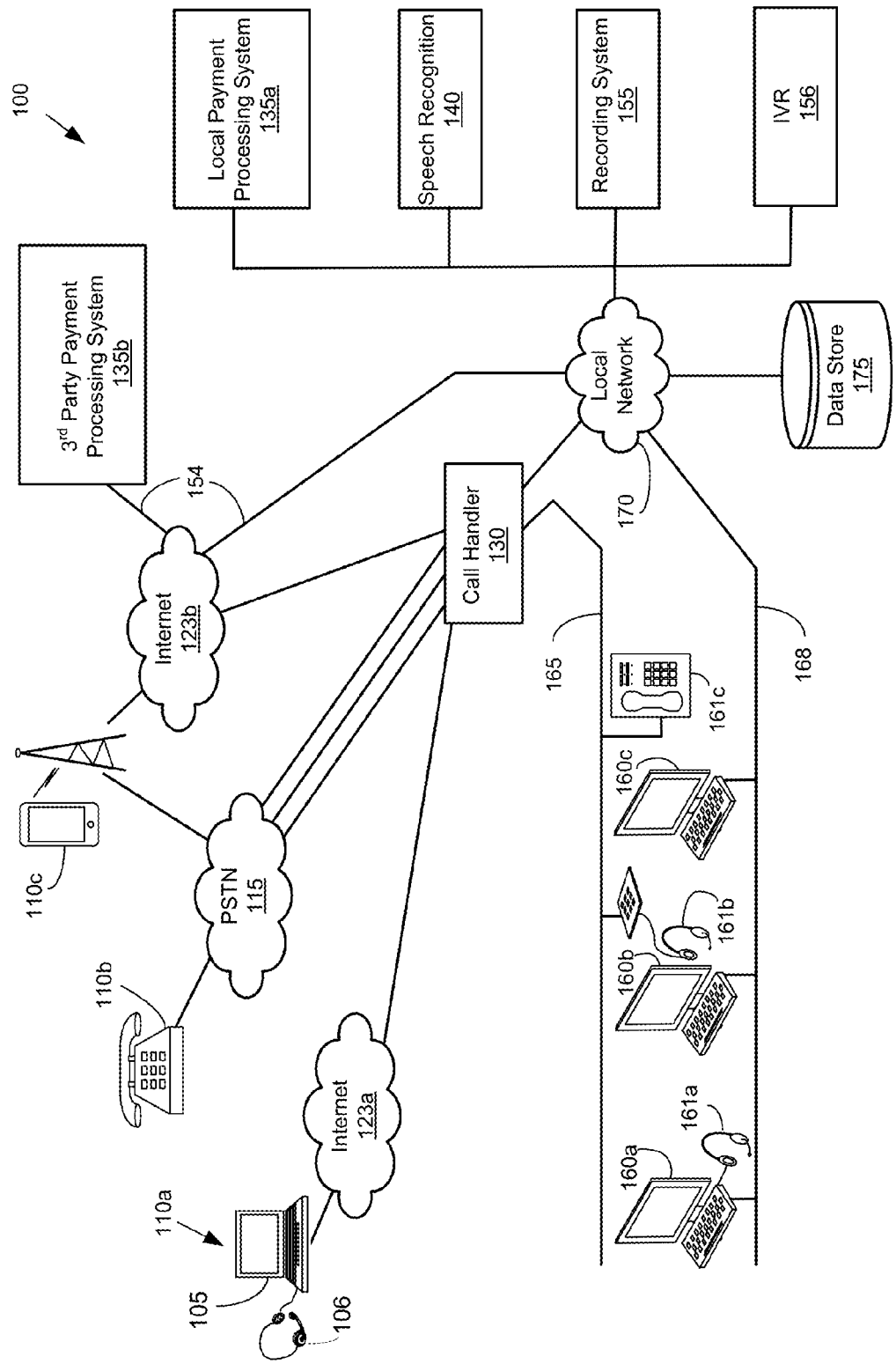
FIG. 1 shows one embodiment of a contact center architecture that may incorporate the concepts and technologies as disclosed herein.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

Exemplary Contact Center Architecture

FIG. 1 shows one embodiment of a contact center architecture 100 illustrating the various technologies disclosed herein. The architecture 100 shown in FIG. 1 may process voice calls that are inbound-only, outbound-only, or a combination of both (sometimes referred to as a "blended" contact center). Although many aspects of contact center operation are disclosed in the context of voice calls, in various embodiments, the contact center may process other forms of communication such as, for example, facsimiles, emails, text messages, video calls, and chat messages. Since the preferred embodiment of the invention involves voice calls, the contact center may be referred to as a call center in various illustrations herein.

Since the call center may handle calls originating from a calling party, or initiated to a called party, the term "party" or "remote party" without any further qualification, refers to a person associated with a call processed by the call center, where the call is either received from or placed to the party. The term "caller," if used, will also generally refer to a party communicating with the call center, but in many cases this usage is exemplary. Thus, use of the term "caller" is not intended to limit the concepts to only inbound calls or voice calls, unless the context dictates such.

Depending on the embodiment, inbound voice calls may originate from calling parties using a variety of different phone types including, smart phone devices 110c, conventional telephones 110b, or computer-based voice processing devices 110a, comprising a computer 105 and a headset 106. For instance, a calling party may originate a call from a conventional analog telephone 110b connected to a public switched telephone network ("PSTN") 115 using an analog plain old telephone service ("POTS") line. The call may be routed by the PSTN 115 and may comprise various types of facilities, including, but not limited to: T1 trunks, SONET based fiber optic networks, asynchronous transfer mode networks, etc. Various types of routers, switches, bridges, gateways, and other types of equipment may be involved in the processing of the calls.

In various embodiments, inbound calls from callers to the call center may be received at a call handler 130, which could be, e.g., an automatic call distributor ("ACD"). In particular embodiments, the call handler 130 may be a specialized form of switch for receiving and routing inbound calls under various conditions. The call handler 130 may route an incoming call over call center facilities 165 to an available agent. The call handler 130 may also incorporate other switching functionality, including the ability of conferencing or bridging another entity to an existing call.

Depending on the embodiment, the facilities 165 may be any suitable technology for conveying the call to an agent, including but not limited to a local area network ("LAN"), wide area network ("WAN"), ISDN, or conventional TDM circuits. In addition, the facilities 165 may be the same or different from the facilities used to transport the call to the call handler 130.

In various embodiments, calls may be routed over facilities 165 to an agent for servicing. That is, for example, the party may speak with an agent to receive customer service. An agent typically uses a computing device 160a-160c, such as a personal computer, and a voice device 161a-161c. The combination of computing device 160a-160c and voice device 161a-161c may be referred to as a "workstation." In many instances, the computing device handles VoIP so that reference to the "computer workstation" or the "agent's computer" refers to the computer processing device aspect of the workstation, but which may be closely integrated with handling voice as well. Thus, for these particular embodiments, the workstation can be assumed to have at least a data capability and may also have a voice capability.

In various embodiments, the call handler 130 may place an incoming call in a queue if there are no suitable agents available, and/or it may route the call to an IVR 156 to play voice prompts. In particular embodiments, these prompts may be in a menu type structure and the IVR 156 may collect and analyze responses from the party in the form of DMTF tones and/or speech. In addition, the IVR 156 may be used to further identify the purpose of the call, which may involve, for example, prompting the party to enter account information or otherwise obtain information used to service the call. In other configurations, the IVR 156 may be used to only provide announcements. The party may also use the IVR 156 to provide payment information, such as credit card information, expiration date, security code, or other forms of sensitive information.

Depending on the embodiment, the interaction between the call handler 130, IVR 156, agent computers 160a-160c, as well as other components, may involve using a local area network ("LAN") 170. In particular embodiments, when an agent is interacting with a called or calling party, the agent may use his computer 160a-160c to further interact with other enterprise computing systems, such as, for example, the IVR 156, a speech analytics system, 140, a recording system 155, and a local payment processing system 135a or a third-party payment processing 135b accessed via facilities 154 and via the Internet 123b. In many embodiments, the payment processing system may also incorporate an IVR.

In addition to receiving inbound communications, including, for example, voice calls, emails, text messages, and facsimiles, the call center may also originate communications to a called party, referred to herein as "outbound" communications. In some embodiments, a call handler 130 may comprise a dialer, such as a predictive dialer, to originate outbound calls at a rate designed to meet various criteria. In various embodiments, the call handler 130 is typically configured to dial a list of telephone numbers to initiate outbound calls. Data for the calls may be stored in a data store 175. After the calls are originated, a transfer operation may connect the call with an agent or a queue. In certain embodiments, the dialer will incorporate switching structure for bridging on another entity to an existing call, such as the IVR 156.

The architecture of FIG. 1 illustrates an IVR 156, a local payment processing system 135a, and a third-party payment processing system 135b. In various embodiments, the IVR 156 may be bridged onto an existing call so that the party may interact with the IVR. The IVR may prompt the party for various sensitive information, such as social security number, which may be checked against existing records for the party. In other embodiments, a local payment processing system 135a may be joined to the call to prompt the party to entry sensitive information in the form of credit card or similar account information. The local payment processing system 135a may incorporate IVR functionality, as well as other functionality to accomplishing payment. Finally, the call handler 130 may join in a remote third-party payment processing system 135b via a connection 154 to the Internet 123b or other network, which connected with the third-party payment processing system 135b. The use of a third-party payment processing system 135b may allow a contact center to avoid having to incorporate an on-site or local payment processing system 135a. In various embodiments, these and other combinations can be used to prompt and receive sensitive information from a caller. Further, these components may incorporate speech recognition capabilities, so that the sensitive information may be indicated via DTMF tones or speech, as the need arises.

Although a number of the above entities may be referred to as a "component," each may be also referred to in the art as a "computing device," "unit" or "system." A server may incorporate a local data store and/or interface with an external data store. Use of the word "server" does not require the component to interact in a client-server arrangement with other components, although that may be the case. Further, the above components may be located remotely from (or co-located with) other components. Furthermore, one or more of the components may be implemented on a single processing device to perform the functions described herein. In addition, the contact center architecture 100 may be provided as a hosted solution, where the call processing functionality is provided as a communication service (a so-called "communication-as-a-service" or "CaaS") to a call center operator. Thus, there is no requirement that the components identified above must be actually located in a call center location or controlled by a call center operator. In addition, depending on the embodiment, the agent positions may be remotely located from the other components of the call center, sometimes referred to as a "virtual call center." Those skilled in art will recognize FIG. 1 represents one possible configuration of a contact center architecture 100, and variations are possible with respect to the protocols, facilities, components, technologies, and equipment used.

Service Overview

A party may interact with an agent for various reasons depending on the context of the call, and may need to convey sensitive information. This can be used to verify the identity of the party, effect payment by prompting the party for financial account information, etc. In the various embodiments disclosed herein, a recording system may be also involved. A goal is to prevent sensitive information from being exposed to the agent and/or recorded by the recording system.

Typically, the agent will discuss various preliminary aspects with the party, and then a need arises during the call for the party to provide the sensitive information. For example, the party may be required to indicate their social security number or a password to an account. The party may interact with a payment processing system to provide payment information, such as their credit card account number, expiration date, and security information. The payment processing system 135b could be operated by a third party relative to the operator of the contact center or could be integrated with the contact center i.e., a local third-party payment processing system 135a.

In some instances, the agent could transfer the party to the IVR (or other component). This would allow the party to interact privately with the IVR, as the agent is no longer part of the call. Thus, the agent would not be privy to the sensitive information. However, the agent would have relinquished control of the call and would not know if or when the party required further assistance or whether the transaction was accomplished. Further, if the call is to be recorded, it is not clear whether transferring the call would interrupt recording the call. This may require recording to occur at the IVR location, which may be impractical if the IVR is a third-party controlled component.

Alternatively, the agent may bridge (i.e., conference) the IVR (or other component) to the call. This would allow the agent to aid the party during their interaction with the IVR, monitor the progress of the call, and to detect when the call is completed. However, a conventional bridge capability (a.k.a. conferencing bridge, bridge, or three-way bridge) is not secure and would allow the agent to hear all of the agent-IVR interactions. Thus, the agent would hear the sensitive information. Further, if the call is recorded, the sensitive information would also be recorded.

The sensitive information provided by the party may represent various types of information such as security information (e.g., password), financial information (e.g., account number), personal information (social security number), health related information (health test results), etc. In many instances, the caller is required to provide sensitive information to obtain the desired services. Often, the caller is amenable to providing the sensitive information, provided it is carefully safeguarded. Various industry security compliance programs and/or regulations require contact center operators to safeguard sensitive information, hence contact center operators also have a motivation to safeguard this information. An easy solution is to avoid unnecessary exposure in the first place.

In general, any exposure of sensitive information to a human is a potential vulnerability. Therefore, it is desirable to limit exposure of sensitive information to humans whenever possible. In the contact center environment, there are two common potential avenues for exposing of sensitive information. The first involves exposure to the agent handling the call, wherein the remote party provides the sensitive information to the IVR during a conference call. The second exposure involves individuals that are able to retrieve call recordings of the call that include the sensitive information.

In many instances the agent interacting with the party is required to be involved in preliminary communications leading up to the need for the sensitive information. However, in many cases, the agent does not need to know the sensitive information per se. For example, an agent may assist in selling an item to the party and may need to coordinate payment by the party using a credit card. In many instances, the caller may interact with an automated system joined to the call, such as an IVR, to convey the credit card information. The agent needs to know whether the payment has been accomplished, but does not need to know the credit card information itself. Bridging on an automated payment processing system with an IVR is quick and easy, but mechanisms are required to avoid exposing the sensitive information to the agent.

Further, in many instances the call is recorded. The contents of the call may be recorded to ascertain what was spoken between the agent and the party, or may be used to ensure that the agent followed appropriate policies. Again, the reviewing party typically does not need to know the sensitive information per se, which would occur if the call recording also recorded the sensitive information.

Architectural Foundation

Figure 2A:
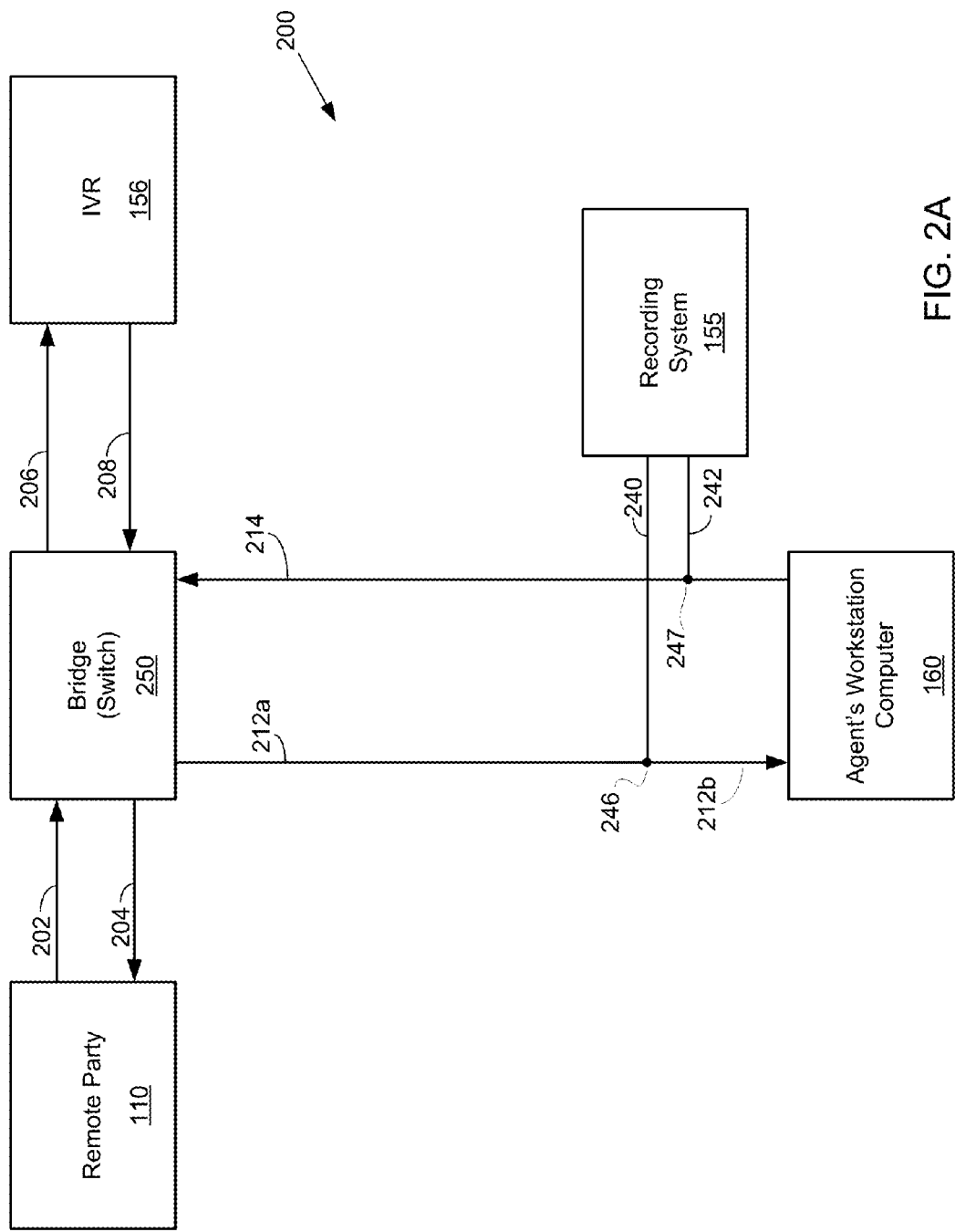
FIG. 2A illustrates one embodiment of an architecture of a conference call involving an agent's workstation computer and a remote party that are conferenced with an IVR.

An architecture upon which the various embodiments is built upon is shown in FIG. 2A. Turning to FIG. 2A, the architecture 200 comprises an agent's workstation computer 160 engaged in a call with a phone of the remote party 110. In many instances herein, the agent's workstation computer 160 is simply referred to as the agent for simplicity. Instances where the distinction between the agent and the agent's workstation computer is material will be evident from the context. The agent communicates with the party via a call handler 130 (not shown in FIG. 2A), which comprises a bridge 250 in a switch. Switches are well known in the art of telecommunications, and often incorporate a special structure known as bridges (a.k.a. a "conference bridge"), which allows three parties to be joined (also referred to as "conferenced" or "bridged"). In many contexts, the bridge can be considered a special form of a switch, and the terms may be sometimes used interchangeably. The bridge 250 may reflect a conventional resource for bridging a third party onto an existing call. As such, its internal operation is not shown, as those skilled in the art of telecommunications are acquainted with its operation.

When the party needs to enter sensitive information, the agent will join (e.g., conference) another device, such as an IVR 156. The device joined could be the local payment processing system 135a or a third-party payment processing system 135b. For purposes of illustration and simplicity, the device joined to the call to receive the sensitive information, regardless of form, is generally illustrated as an IVR 156, although other embodiments may involve other types of devices. Thus, reference to the IVR 156 as receiving credit card information does not mean that other embodiments could not use a payment processing system 135a, 135b.

The remote party may provide sensitive information to the IVR 156 over a voice channel in one of two ways. First, the sensitive information could be spoken by the party. This presumes that some form of speech recognition or speech analytics are used in the IVR to ascertain the speech content. Speech can be used to convey a password or the answer to a secret question. It can also be used to convey numerical information, such as account information. Second, the sensitive information could be entered by the party using DTMF tones, commonly referred to as 'touch-tones®.' This requires a DTMF receiver, detector, or equivalent, which are incorporated in IVRs. DTMF is commonly used to convey numerical information, such as account numbers, over a telephone. DTMF has an advantage over speech recognition in that it is generally recognized as more reliable than speech recognition, and further, it is language independent. DTMF is generally available on most phones and is often less expensive to implement than speech recognition.

Another device that may be involved is a recording system 155. The recording system records the information spoken or otherwise aurally conveyed over the voice channels (both to and from the party). It may be presumed that the recording system records all information present on the voice channels, unless explicitly controlled otherwise. The interconnection arrangement of the recording system via channels 240 and 242 at nodes 246 and 247 is one arrangement, but other arrangements are possible.

The architecture of FIG. 2A illustrates half duplex voice channels, e.g., in which information is transmitted unidirectional. In a digital environment, voice is often segregated based on whether it is audio data going to, or from, a party. Thus, a voice conversation comprises two half-duplex channels. Specifically, voice emanating from the remote party 110 is shown on a channel 202, and a separate channel 204 represents voice going to the remote party. Similarly, voice to the IVR 156 is shown in a channel 206 whereas voice prompts from the IVR and to the bridge 250 occur on another channel 208. Finally, voice to the agent's workstation computer 160 is on one channel 212, whereas voice signals from the agent to the bridge are on another channel 214. For reasons that will become evident, the voice channel 212 between the bridge 250 and the agent's workstation computer 160 is divided into two portions or legs, 212a and 212b.

The bridge 250 acts as a three-way conduit, so that an input, such as speech from one entity, is sent to the other two entities on the bridge. Specifically, audio from the party on channel 202 is sent out to the agent's workstation computer 160 on a channel 212a and sent to the IVR 156 on another channel 206.

The recording system 155 is effectively bridged on to the voice channels 212 and 214 to and from the agent respectively. The junction points or nodes 246 and 247 are in effect, a form of hardwired bridge, in that information received into a junction point is sent to the other two channels or legs attached to it. However, because this is more of a permanent bridging, which is not handled on a call-by-call basis, it is shown as "hard-wired," as opposed to bridge 250 that may be invoked on a call-by-call basis by the agent.

In this embodiment, the positioning of the recording system 155 is such that any information that is provided to or from the agent's workstation computer 160 is recorded. Thus, the information provided to the agent would be recorded as would any information provided by the party (including sensitive information), or any information provided by the IVR. Similarly, any information provided by the agent would be also provided to the party and the IVR, and would also be recorded.

Figure 2B:
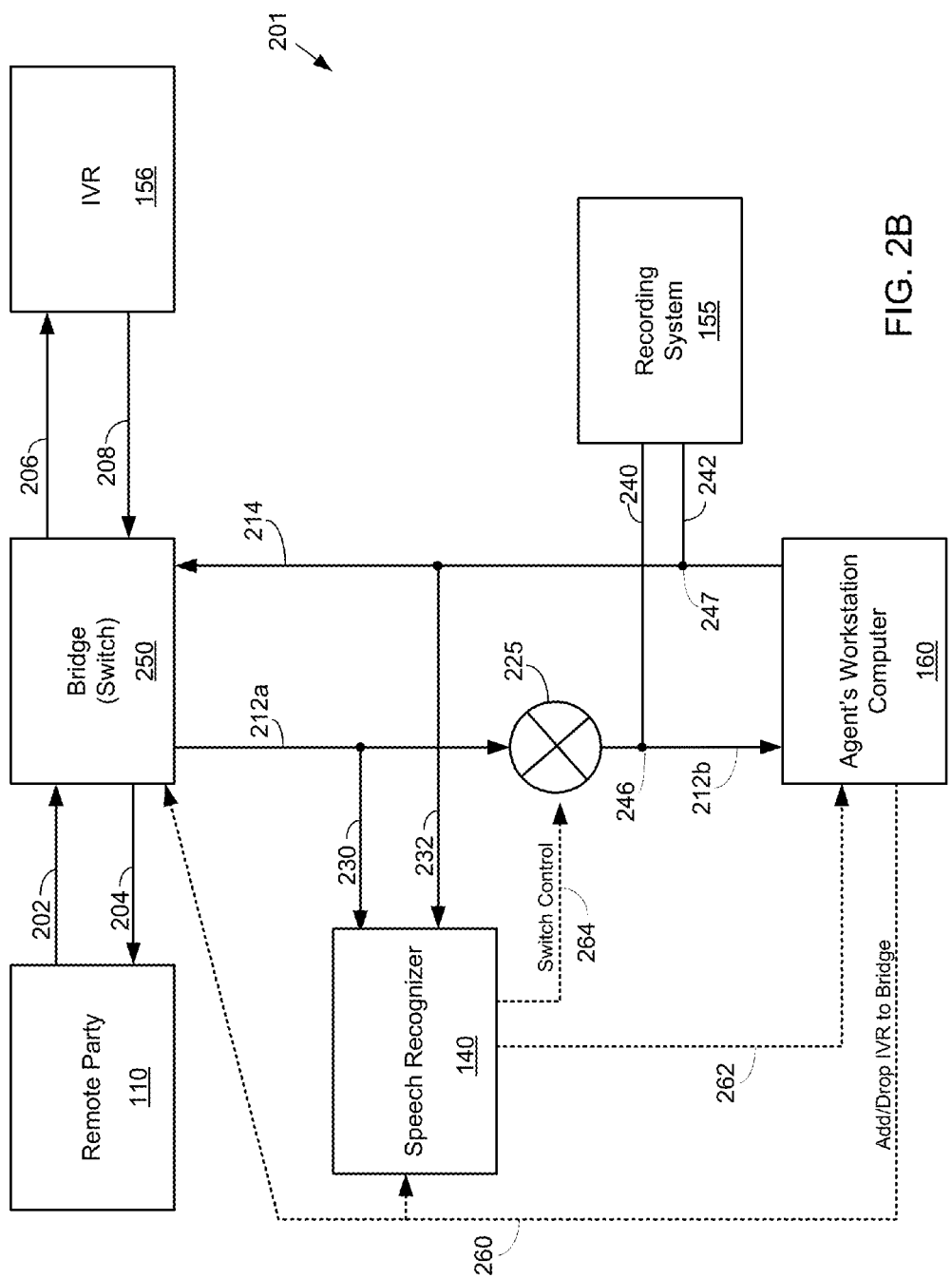

One approach for protecting sensitive information provided by the party to the agent is shown in the architecture 201 of FIG. 2B. This builds upon the architecture 200 of FIG. 2A by adding a speech recognizer 140 that controls a switch 225. The speech recognizer 140 includes a channel 230 that monitors any information provided by the party 110, as well as a channel 232 that monitors any information provided by the IVR 156. The speech recognizer includes a signaling link 264 (denoted by a dotted line to distinguish it from voice channels that are shown via a solid line), which activates the switch 225. The switch 225 opens or closes the channel 212, effectively dividing it into a first leg 212a and a second log 212b. When the switch 225 is opened, information on the leg 212a is interrupted from being provided on leg 212b. Thus, the agent does not hear any party provided information when switch 225 is open.

The speech recognizer 140 also receives signaling input 260 from the agent's workstation computer 160 that is also provided to the bridge 250. This signaling comprises commands to the bridge 250 to instruct it to conference on the IVR or drop the IVR. Such commands are well known in telecommunications for adding and dropping a party on a conference bridge call. The speech recognizer 140 thus knows when the IVR 156 is bridged onto the call, and when it is not. When the IVR is bridged on, the speech recognizer 140 can monitor the audio instructions provided by the IVR to the party and as well as the party's responses using channels 230 and 232.

The operation of such a system is now described. Initially, the agent and the party are communicating via a switch (but without using a bridge) and without the IVR bridged on. The agent and party may be discussing payment options, and the party is ready to pay via a credit card. Thus, the party is required to enter sensitive information. The agent informs the party that an IVR 156 functioning as an automated payment processing system will be bridged onto the call, and the agent informs the party that the agent will not be able to hear any of the party's responses (e.g., sensitive information). The agent then instructs the workstation computer 160 to bridge the IVR 156 onto the call using the bridge 250. This results in a signaling message sent over the link 260, which is also received by the speech recognizer 140. Thus, the speech recognizer knows that an IVR is about to be bridged onto the call.

The switch then joins the remote party and the agent using bridge 250 with the IVR 156, and the speech recognizer begins to monitor the speech on channels 230 and 232, which correspond to channels 212*a* and 214. Voice information on channel 232 represents information provided by the IVR 156. Presumably, this includes prompts, and preferably the prompts do not voice-back or repeat any type of sensitive information provided by the party. Presumably, the speech recognizer 140 is also able to distinguish between the voice provided by the IVR and speech provided by the remote party.

Initially, the speech recognizer 140 will control the switch 225 to keep the circuit closed. In this mode, the agent hears any information exchanged between the remote party and the IVR. Presumably, the IVR will prompt the party for certain information, such as a credit card number. At this point, the speech recognizer will recognize the prompt from the IVR and knows that sensitive information will be provided in response by the party. Once the IVR prompt is completed, the speech recognizer will then direct the switch 225 to open. At this point, the agent can no longer hear any responses from the party. The speech recognizer 140 is able to hear the response from the party, and when the response is complete and the IVR resumes, the speech recognizer 140 closes the switch 225. Essentially, the speech recognizer can be configured to interrupt the channel to the agent whenever the party speaks a response to the IVR. Thus, the agent hears the questions and/or prompts from the IVR, but not the party's responses. If the party states something during a prompt, then the agent will not hear this. Further, in this configuration, the recording system 155 records the audio data present on channel leg 212*b* and the channel 214, which excludes any party responses to the IVR.

In a variation of the above, the speech recognizer 140 can open the switch 225 whenever either the party or the IVR speaks. In this case, the agent will hear nothing. The speech recognizer can indicate when the transaction is completed via a session complete signaling message on link 262 indicating that the session has completed. This may require the speech recognizer to ascertain when the IVR has completed the transaction. The agent can then drop the IVR from the bridge and continue with the party as appropriate.

This embodiment does not require any redevelopment of a bridge resource in the call handler switch. A separate switching component 225 is added between the bridge 250 and the agent's workstation computer 160 that is selectively opened by the speech recognizer 140, preferably whenever speech or DTMF tones are detected from the party.

FIG. 3

The embodiment of FIG. 2 presumes that the recording system is located after the switch 225, i.e., node 246 is located on leg 212*b*. Namely, whatever information is heard by the agent is the same information that is recorded. Thus, to the extent that sensitive information is excluded from exposure to the agent, it is also excluded from recording. However, in some call handling systems, it may not be readily possible to incorporate a switch 225 at a point prior to the recording system. Rather, an architecture 300 shown in FIG. 3 may be the baseline architecture. Here, the recording system 155 records information on channels 212*a* and 214 before information reaches the switch 225. Thus, opening the switch 225 may exclude sensitive information from the agent, but it does not prevent the recording system from recording the sensitive information.

In this embodiment, the speech recognizer 140 operates in a similar manner. It receives an indication via link 260 from the workstation 160 whether the IVR has been bridged onto the call or not. The speech recognizer 140 then controls the switch 255 via link 264 as to whether the switch should be open or not. A similar indication can be provided via link 310 to the recording system 155 to control whether the recording system should record the agent's response via input channel 240. In essence, when the speech recognizer mutes the audio to the agent by controlling the switch 225, it also instructs the recording system to suspend recording. Thus, although the sensitive information is provided on channel 212*a* and hence to channel 240 to the recording system, the recording system does not record the sensitive information. However, this embodiment requires a capability of the recording system to receive external control signals on link 310.

FIG. 4.

Figure 4:
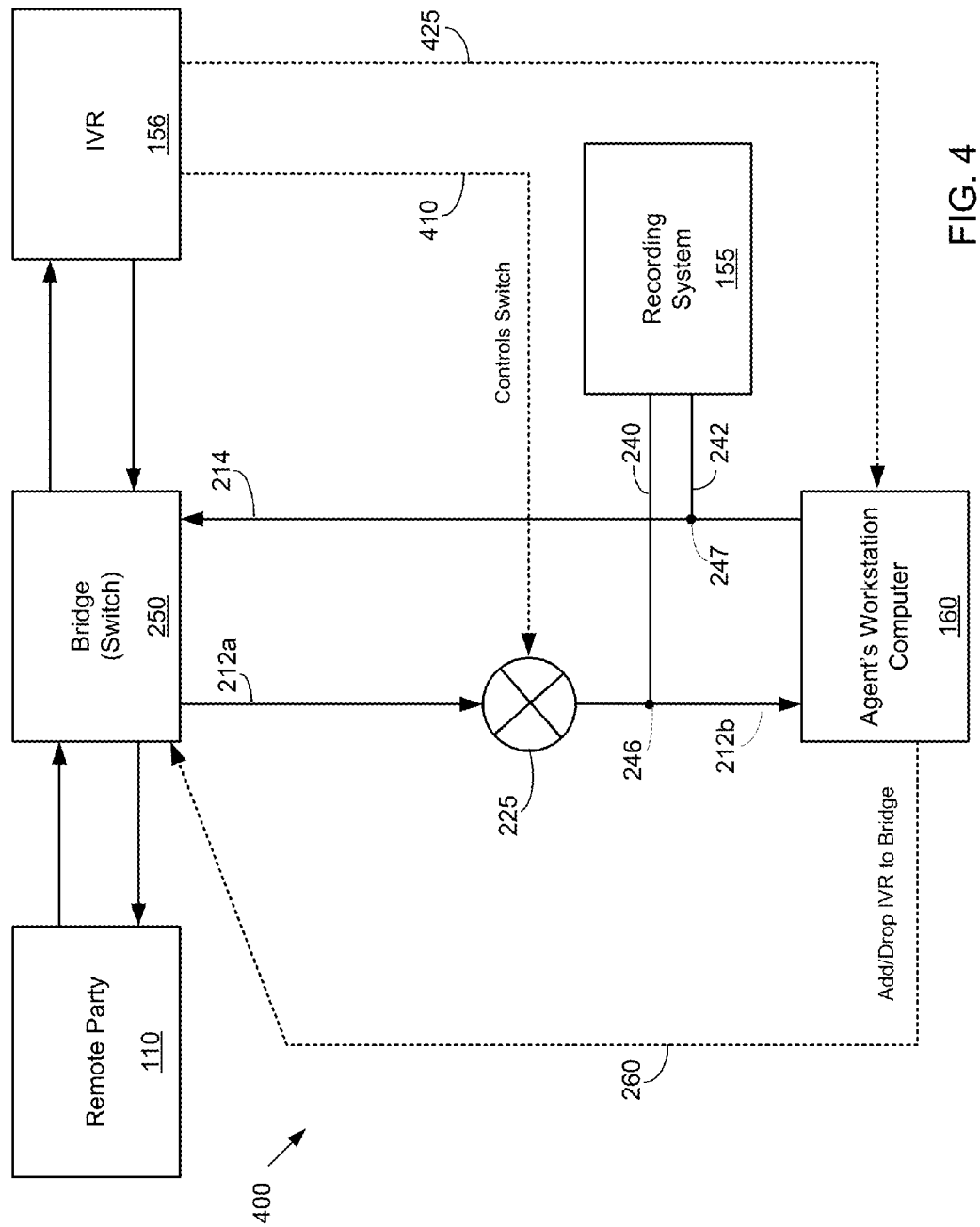

FIG. 4 illustrates another embodiment wherein the IVR 156 controls the switch 225. Turning to FIG. 4, the architecture 400 shows a signaling link 410 between the IVR 156 and the switch 225. In operation, the IVR 156 is aware of when it is bridged onto a call, and further aware of when it prompts the party 110 for information. During the process, when the IVR expects a response from the party, it signals the switch 225 to open, so that the agent does not hear any sensitive information. When the IVR is providing a prompt, it signals the switch 225 to close. Thus, the agent hears the IVR prompts, but does not hear the party's responses. The IVR can be configured to allow non-sensitive party responses to be heard by the agent, but block sensitive information.

In a variation of this embodiment, the IVR 156 provides data via signaling link 425 corresponding to the data entered by the party to the agent's workstation computer. This allows the agent's computer to process the party provided data and update any databases and systems as appropriate (if required in addition to the IVR doing so). Typically, any information displayed to the agent is nullified or limited in some manner. For example, if the party entered a credit card number to the IVR, the data displayed to the agent could be a single character (e.g., "****"). This would protect the sensitive information from exposure to the agent, but allow the agent to see that information was entered. In other embodiments, all but the last few digits of the information are masked. This allows the agent to distinguish, e.g., between two credit accounts, which may end with different digits. Similar modifications can be applied to other embodiments disclosed herein.

This approach requires the payment processing IVR 156 control the switch 225. For integrated IVRs in a contact center, this may be feasible. However, if the IVR is controlled or operated by a third party, then it may be difficult to incorporate the control signaling via signaling link 410.

FIG. 5

Figure 5:
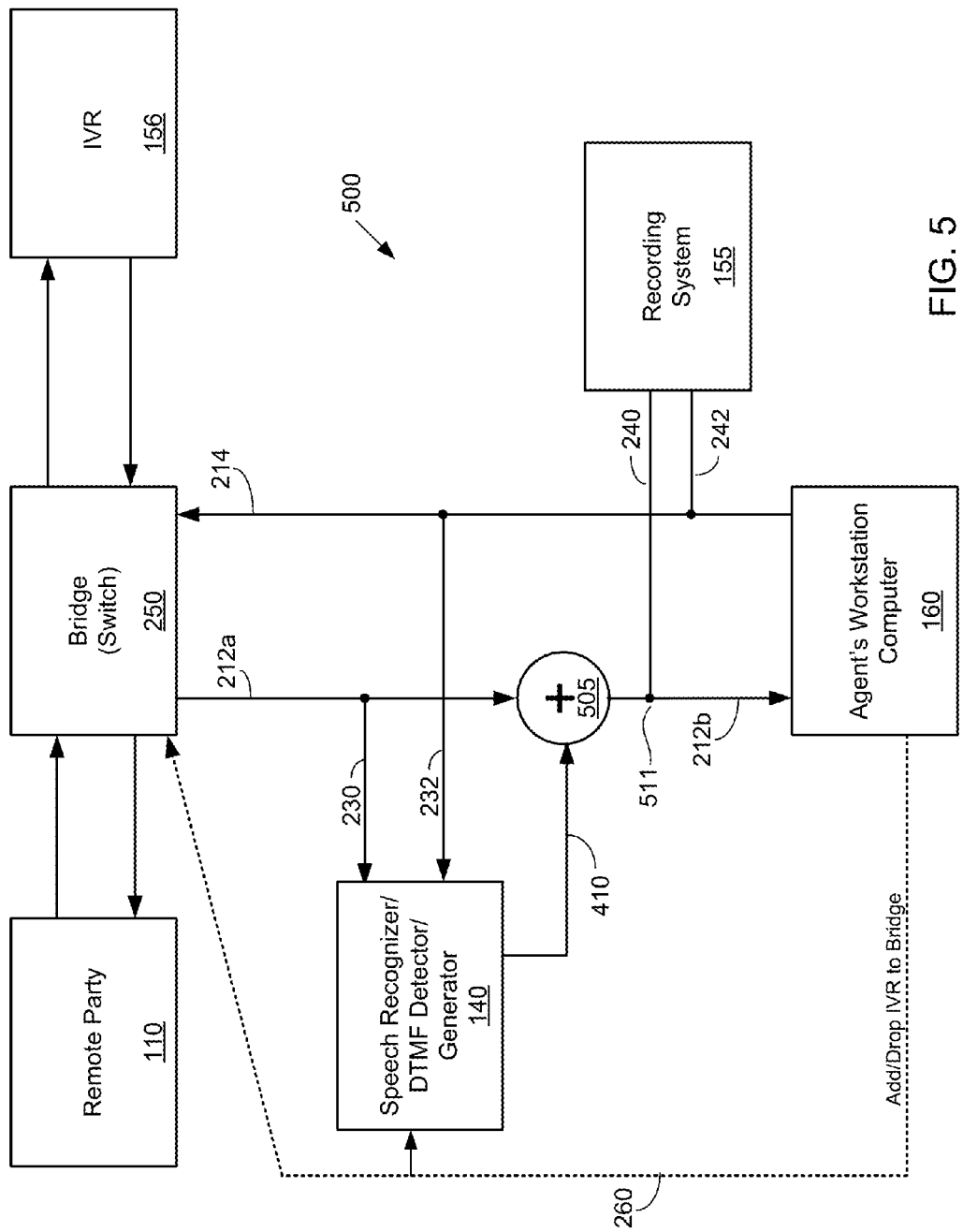

FIG. 5 illustrates another embodiment that allows sensitive information to be scrambled or otherwise modified to prevent recognition by the agent. This architecture 500 allows the agent to detect in real time whether any input was provided by the party in response to a prompt by the IVR, but prevents the agent from recognizing the input. In FIG. 5, the architecture 500 incorporates an audio mixer 505 in series with the channel 212. Specifically, the audio mixer 505 is positioned before audio from the bridge 250 reaches node 511. The purpose of the audio mixer 505 is to add sound as provided on channel 410. In various embodiments the sound could be generated by the DTMF generator 140 and added by the audio mixer as directed via signaling link 410 or the sound could be generated outside of the mixer and provided to the mixer 505.

In this embodiment, the sound is provided by a speech recognizer 140 which may also incorporate a DTMF detector/generator. In various embodiments, the speech recognizer may incorporate various levels of functionality. For example, in one embodiment, the speech recognizer 140 could detect whenever speech from the party is provided. In another embodiment, it could be effectively replaced with a DTMF detector/generator that detects the presence of DTMF input on channel 230. This would detect DTMF input (only, not speech) provided by the party in response to a prompt from the IVR 156. Whenever DTMF is detected by the speech recognition component/DTMF detector 140, it would generate a DTMF sound that is added in real time by the mixer 505 to the DTMF on channel 212*a*. The resulting combination of sounds is then passed onto channel 212*b*, where it is heard by the agent and recorded by the recording system. Thus, the agent could not determine what DTMF tones were indicated by the party. In light of this embodiment, the DTMF detector could replace the speech recognizer 140 of FIG. 3 to form another embodiment where the DTMF detector controls the switch 225 to open it whenever DTMF is detected.

The sounds provided to the mixer could be another, but different, DTMF tone. This would result in a sound that is the combination of two different DTMF tones. It would be difficult for an agent to recognize which of the two DTMF tones was provided by the party. In other embodiments, noise or a sine wave sound could be provided to otherwise render any DTMF tone provided by the agent unrecognizable to the agent.

In another embodiment, the speech recognition/DTMF detector component 140 could be more sophisticated. It could recognize speech, as well as DTMF, provided by the party in response to a speech prompt. It could be configured to recognize when the IVR is prompting the party, and when the agent is responding to the prompt. The speech recognizer 140 could then distort sensitive information provided by the agent, regardless of whether it was provided as speech or DTMF. This would allow the architecture 500 to be used in applications where speech recognition is used by the IVR to receive sensitive information from the party.

In this embodiment the placement of the recording system is such that the modified sensitive information is recorded. Thus, even listeners to the recording would not be able to readily discern the sensitive information. Further, placement of the recording system in this configuration does not require any changes for the IVR 156 controlling the recording system 155. This may be preferable if the IVR is operated by a third-party.

FIG. 6

A variation of the system 500 is shown in FIG. 6. In this architecture 600, a digital signal processor ("DSP") 615 is used in lieu of a switch. The DSP 615 is able to modify, replace or add sound. It can be configured to scramble incoming sounds on channel 212*a* when commanded on control via input link 610. Thus, the speech detector 605 directs the DSP 615 when to scramble the audio to channel 212*b* so that the agent does not hear sensitive information. If only DTMF sensitive information is to be scrambled, then the speech detector 605 could simply be a DTMF detector that detects DTMF tones on input channel 620. If sensitive speech information is to be scrambled, then the speech detector 605 could be a full-fledged speech detection/recognition system that may be configured to distinguish IVR speech from the party's speech, and only activate the DSP when the party speaks to the IVR. Note again, that in this embodiment, the placement of the recording system is such that no modifications are required to control when information is recorded.

Internal Modified Bridge Structure

In the above embodiments, structure external to the bridge was defined. This allows existing bridges in a switch to be used without modification. In many embodiments, modification of a bridge within a switch is not readily feasible, since the switch is typically a proprietary structure that is not amenable to modification other than by the manufacturer. This is frequently the case for conventional enterprise level time division multiplexed switches, which may be found in call handlers or PBXs. However, various open-source telephone switching platforms are readily available where functionality may be readily altered. With the advent of digitized voice such as VoIP, session initiation protocol ("SIP"), and open source telephony platforms, modifications to platforms handling voice traffic are readily feasible. The following embodiments are predicated on modification of the bridge structure in a switch, which may be a SIP based switch, which avoids or minimizes adding structure outside of the switching structure. These approaches may minimize impact to other components in a call center, as will be seen.

In an environment where digitized voice is processed, such as VoIP packets, a three-way bridge can be deconstructed into two elements—a splitter and a combiner. These could be implemented as physical constructs, or as logical constructs implemented as a process or module by a processing system. A splitter 700 is illustrated in FIG. 7A. Input to the splitter is provided to input leg 705, and at the node 707 the voice data is replicated (or "split") onto two output legs 710 and 715. Thus, voice inputs are split to two destinations. This is similar to the bridge function on a conference bridge. The node 707 can be implemented by a processor that receives audio packets and duplicates the audio data to two routing destinations. Any data provided at the input is provided to the outputs.

A combiner 750 is illustrated in FIG. 7B. In this case, two inputs are received respectively on input legs 750 and 760. At node 727 the voice data is combined and sent to output leg 755. In this embodiment, a processor implementing the node 727 could process the audio data appropriately by combining the sounds to generate the resulting audio data onto the output leg 755.

Figure 8:
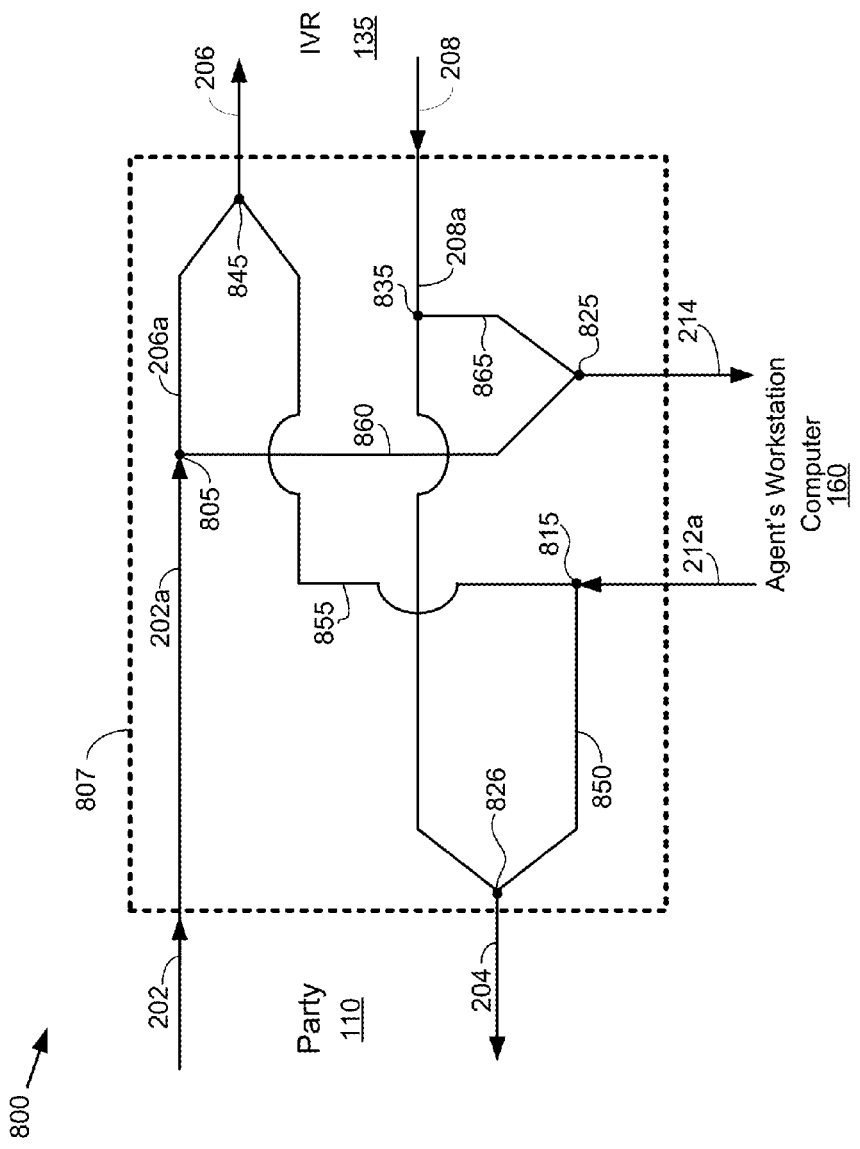
FIG. 8 illustrates one embodiment of a three-way audio bridge comprised of splitters and combiners.

Using these constructs of a splitter and combiner, a three-way bridge for handling digitized voice can be illustrated in FIG. 8. Specifically, three splitters and three combiners can be configured to form the three-way bridge. In FIG. 8 the architecture 800 comprises a bridge 807 comprises respective inputs 202, 212*a*, 208 from the party, the agent's workstation computer, and the IVR, as well as the respective outputs 204, 214, 206 to the party, workstation, and IVR. The bridge 807 comprises combiners with nodes 825, 845, and 825, and splitters with nodes 815, 805, and 835. Internal legs 202*a*, 850, 202*a*, 855, 206*a*, 860, 865, connect the splitters and combiners as shown.

Figure 14A:
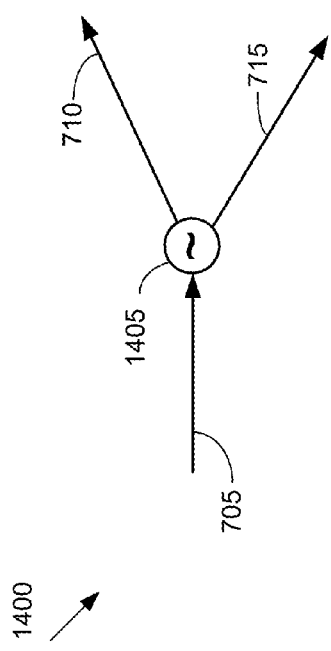
FIGS. 14A-14C illustrate additional embodiments for providing a secure three-way bridge according to the concepts and technologies disclosed herein.
Figure 14B:
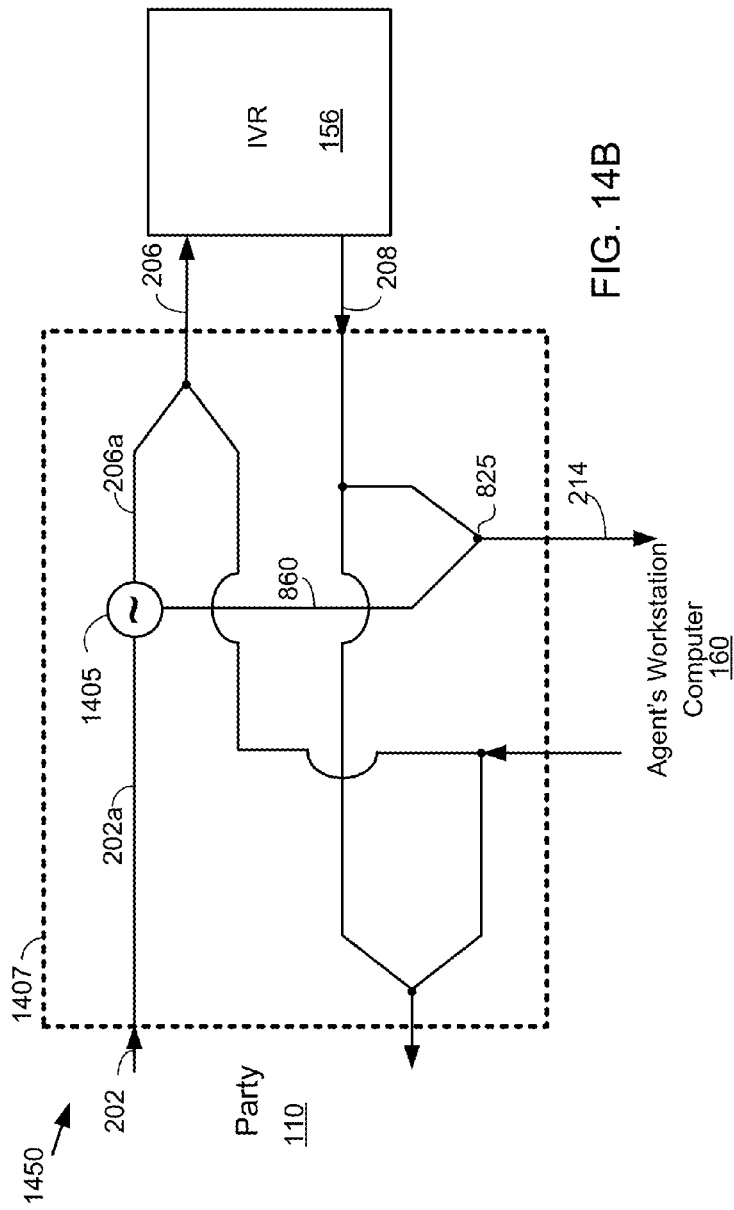
Figure 14C:
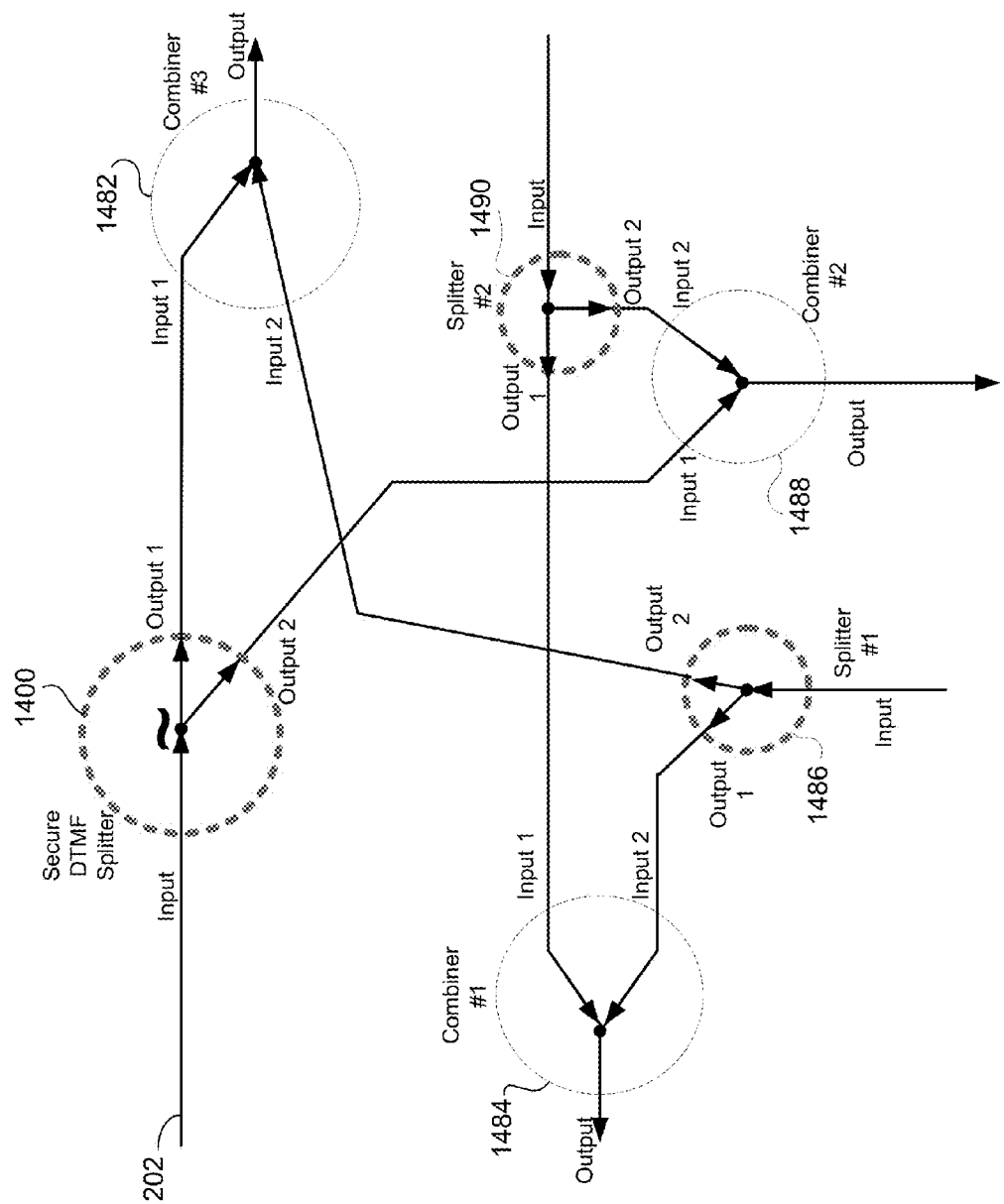

To facilitate illustration of how FIG. 8 can be broken down into three splitters and three combiners, the illustration of FIG. 14C is useful. FIG. 14C shows a three-way bridge comprising three splitters 1400, 1490, and 1486 and three combiners 1483, 1484, and 1488 that are separately identified. Splitter 1400 is, in fact, a special form of splitter (see below), but nevertheless illustrates how the components are connected. Further, FIG. 14C labels each of the splitter's respective input and outputs and each of the splitter's inputs and output. This figure and the labels of the various components can be used to facilitate a textual description of how a three-way bridge is interconnected using splitters and combiners.

FIG. 9

Figure 9:
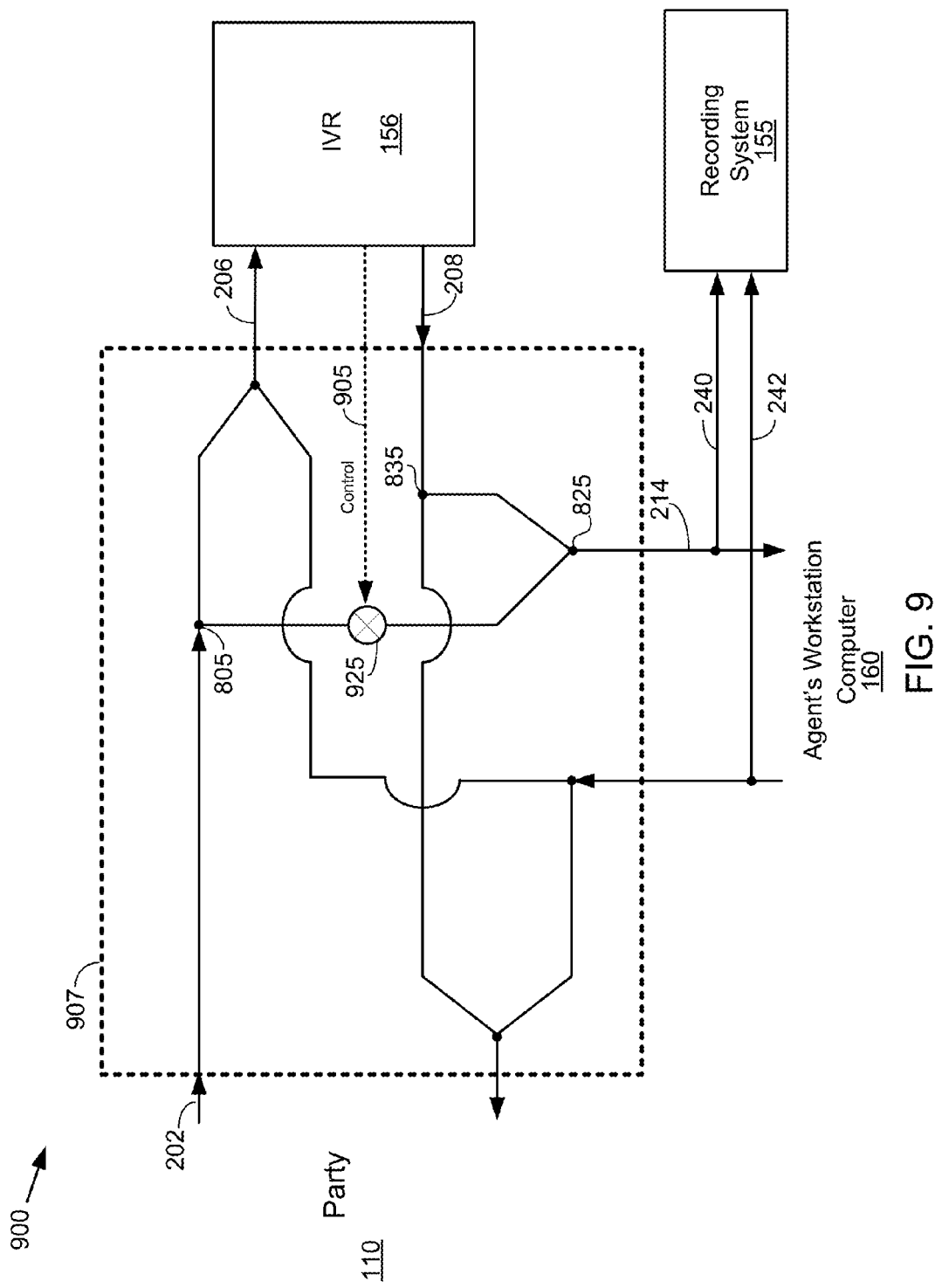
FIGS. 9-12 illustrate various embodiments of a secure three-way bridge for suppressing sensitive information provided by a party to an agent and/or recording system.

Using this three-way bridge 807 of FIG. 8 as a construct to build upon, one embodiment for protecting sensitive information provided by a party is shown in FIG. 9. Because this architecture 900 modifies the structure of the three-way bridge 807 to process digitized voice to protect sensitive information, this can be referred to a "secure three-way bridge." Defining a secure three-way bridge allows the call center to use this three-way bridge as a resource in lieu of a conventional three-way bridge, and this avoids having to modify other components in the call center to protect sensitive information provided by the remote party.

The secure three-way bridge 907 incorporates a switch 925 that is present on the leg joining nodes 807 and 825. This switch 925 in the secure three-way bridge 907 functions to interrupt any audio originating from the party on input channel 202 provided to the secure three-way bridge 900 and that is copied at node 805 to the agent via node 825 and then output on channel 214. Audio from the party at input 202 continues to be provided to the IVR 156. Thus, opening switch 925 only mutes audio from the party to the agent.

Figure 10:
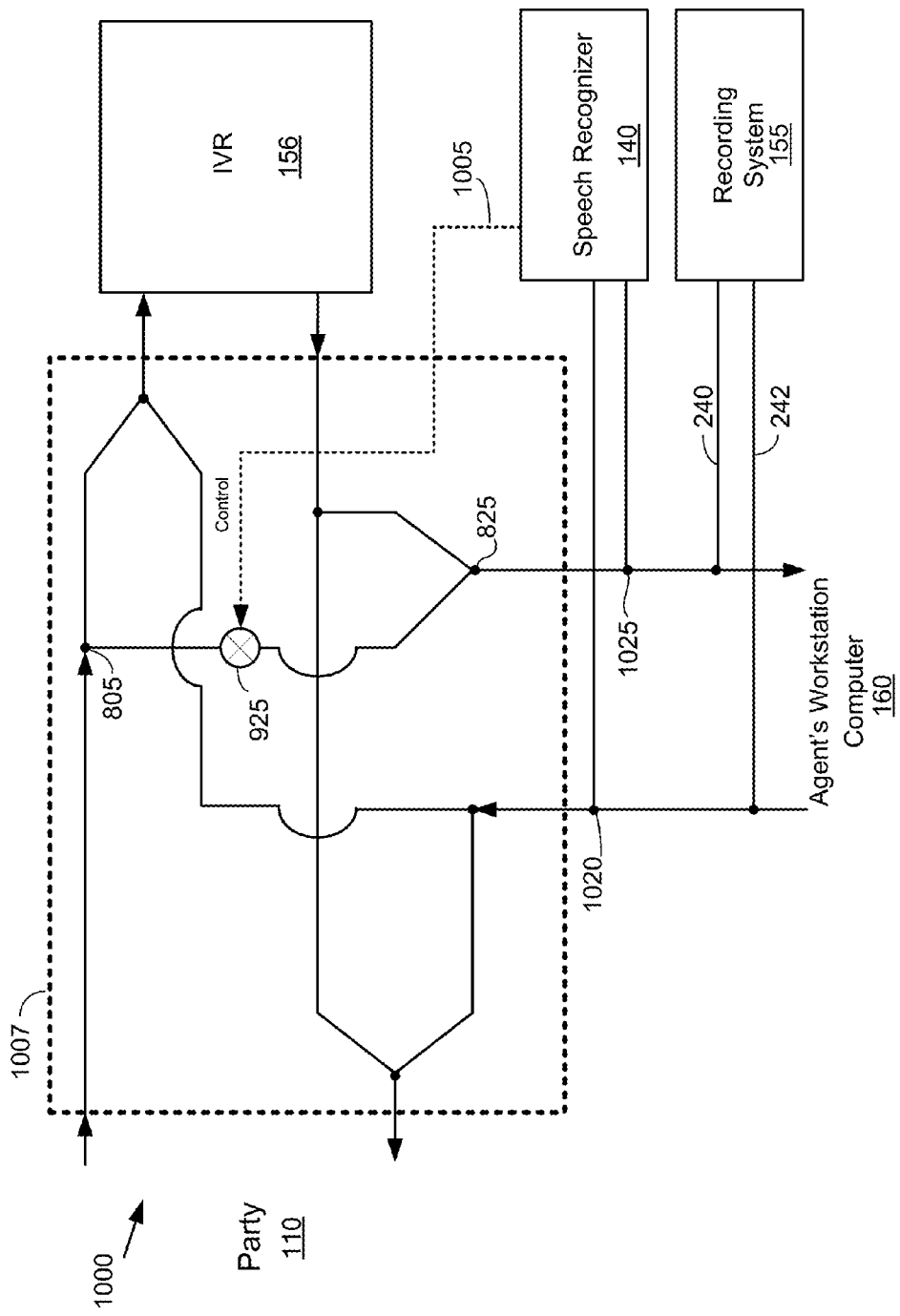

The switch 925 is controlled in this embodiment by the IVR 156. For an implementation where the IVR is closely integrated into the contact center, the IVR readily knows when it is prompting the party and expecting to receive sensitive information input from the agent. Thus, when the IVR expects input from the party, it signals the switch 925 via link 905 to open. In this manner, the IVR 156 can selectively control when sensitive information is muted to the agent. This may function to block sensitive information as either DTMF or speech-oriented sensitive information. The IVR 156 can selectively block all or a portion of the sensitive information.
FIG. 10

Figure 11:
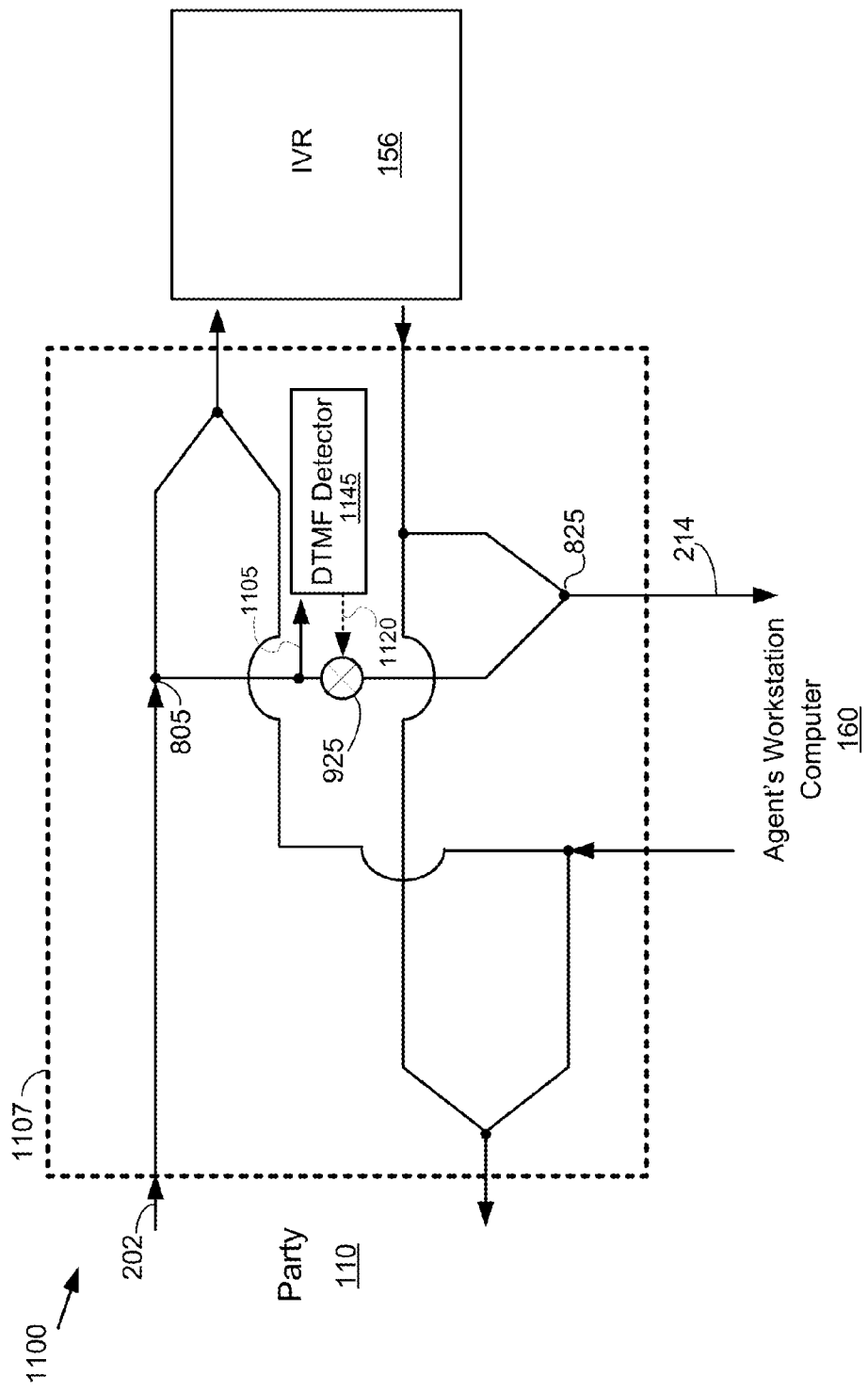

FIG. 10 illustrates a variation of the architecture of FIG. 9. In this architecture 1000, the switch 925 in the secure three-way bridge 1007 is controlled by a speech recognition system 140 via a control link 1005. This arrangement more easily accommodates a third party IVR, which may not incorporate a control link for controlling the switch 925. In this embodiment, the speech recognizer 140 monitors audio data present at nodes 1020 and 1025, which represent audio data that is provided to the agent and received from the agent. This allows the speech recognizer 140 to monitor IVR prompts to the party (which are also provided to the agent) and responses from the party. Upon detecting sensitive information (either as speech or DTMF) provided by the party in response to a prompt, the speech recognizer 140 signals the switch 925 to open the channel, so that the agent and recording system are not exposed to the sensitive data.
FIG. 11

FIG. 11 illustrates another architecture 1100 of a secure three-way bridge 1107 that is largely self-contained. In this embodiment, the secure three-way bridge 1107 incorporates a DTMF detector 1145 that is configured via input 1105 to receive audio input that originated from the party via channel 202. In particular, the DTMF detector 1145 is configured to detect any DTMF input from the party. Upon detection of DTMF input, the DTMF detector 1145 provides a control signal on control link 1120 to the switch 925, instructing the switch to open. Upon opening, the switch 925 prevents sensitive information from being presented to the agent. Any information provided by the party, however, is also provided to the IVR. When the DTMF detector 1145 no longer detects DTMF tones provided by the party, the DTMF detector 1145 sends a signal on link 1120 to the switch to close the channel that connects nodes 805 and 825. Thus, the agent can now hear any audio speech provided by the party.

In another embodiment, the switch 925 could be replaced with a scrambler which could modify the DTMF tone data, or otherwise modifying the data to render it unrecognizable to the agent. Thus, whenever DTMF is detected, it may be modified by scrambling the audio.

This embodiment is largely self-contained in that the specialized bridge can be called as a resource similar as a conventional bridge resource. The DTMF detector 1145 is a relatively simple device, in that it has to only detect DTMF as opposed to also detecting speech. Detecting DTMF at node 1105 can be used to trigger the opening of switch 925. Consequently, the output on channel 214 to the agent's workstation computer 160 is provided with the party's speech and the IVR prompts. However, when the party provides any DTMF to the IVR 156, these tones will be effectively muted from the channel 214 to the agent, but will be provided to the IVR.

Figure 12:
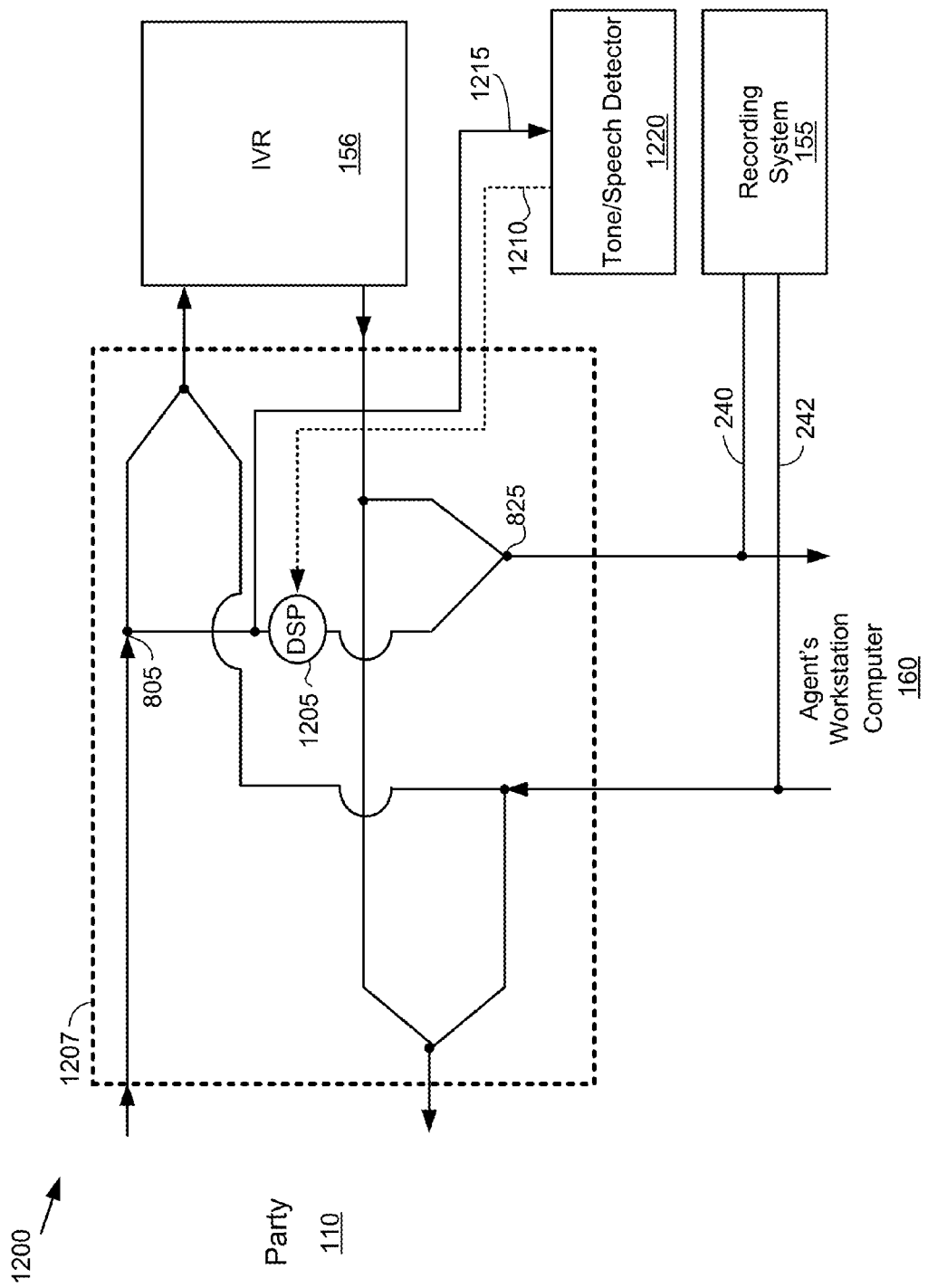

In a variation of this embodiment, the switch 925 could be replaced with a noise or DTMF generator, which when activated by the DTMF detector 1145, adds noise or additional DMTF tones to the output channel 214. This will prevent the agent from comprehending what DTMF tone was provided by the party. Further, any recording of the audio of channel 214 will record the modified tones, so that if the recording is misappropriated, the sensitive information will not be readily comprehended or compromised.
FIG. 12

FIG. 12 is another embodiment of an architecture 1200, wherein a secure three-way bridge 1207 comprises a digital signal processor ("DSP") 1205 in lieu of a switch between the nodes 805 and 825. The DSP 1205 is controlled by a signaling link 1210 by an external resource including a tone/speech detector 1220. The tone/speech detector 1220 monitors the audio channel from the party using channel 1215. The DSP can be configured to "garble" or otherwise modify the DTMF or speech from the party as necessary. In other embodiments, the "garbling" of the tone data can be encrypted according to a known key or using other encryption technology.

In this embodiment, the agent and the recording system hear the modified DTMF or speech when the party interacts with the IVR 156. The agent will hear the IVR prompts without any distortion. Thus, the agent is able to ascertain certain aspects of the party's interaction with the IVR. If the IVR prompts the party for certain information, the agent will be able to ascertain whether the party was responsive, but without knowing the content of the response. The IVR may be configured to inform the party that help can be provided, or the agent can be returned to the line, by pressing certain keys on the phone. For example, the IVR could indicate "Press the start key ("*") at any time to talk to the agent." When the party presses the "*" key, the IVR could then state "Please hold while the agent returns to the line." Since the agent hears the IVR prompts unmodified, this can queue the agent to drop the IVR from the bridge, and thus return to a conventional two-way conversation with the party. The agent could then re-join the IVR into the call by calling the bridge again, where the party could again provide sensitive information as prompted by the IVR. Note that this capability of the agent controlling the bridge in response to hearing the IVR prompts also applies to other embodiments disclosed herein.

If the sensitive information is encrypted by the DSP 1205, then when the information is recorded by the recording system 155, the data could be later encrypted to recover the sensitive information. This allows the sensitive information to be recovered from the recording when required, but protected otherwise.
Process Flow A process flow for using the secure three-way bridge disclosed in FIG. 11 is now presented. The same or similar process flow could be adapted for certain other embodiments of the secure three-way bridge disclosed. It is noted that the logical operations described in the process flows provided herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Figure 13A:
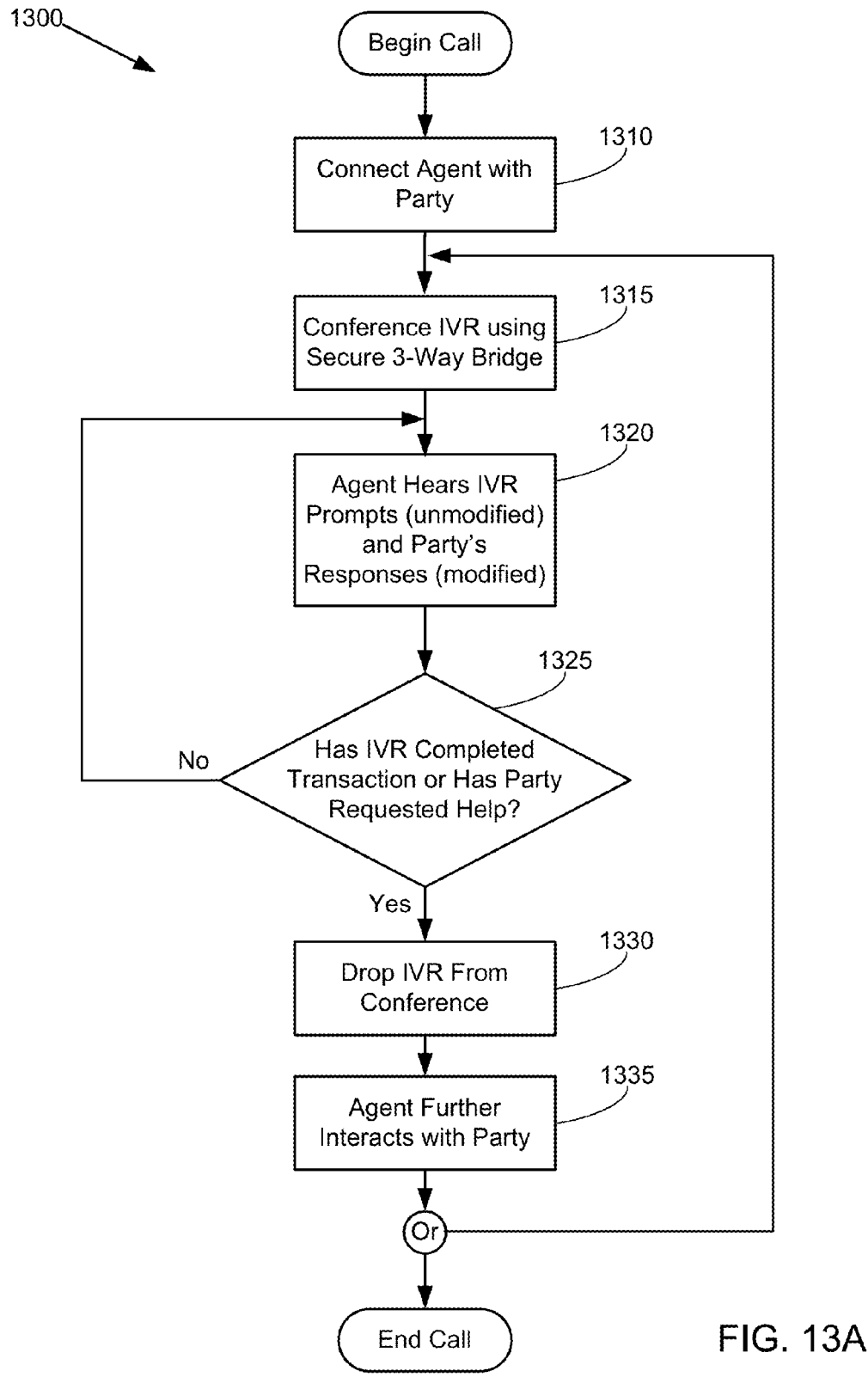
FIG. 13A illustrates one process flow associated with using a secure three-way bridge for suppressing sensitive information provided by a party to an agent and/or recording system.

The process flow 1300 is shown in FIG. 13A and is defined for the secure three-way bridge of FIG. 11. The process flow begins with connecting an agent with a party together on a voice call in operation 1310. The voice call could be for an outgoing or incoming call to the contact center. During the course of the call, the agent may determine that sensitive information, such as payment information, is required from the party. For example, this may occur when the party agrees to purchase items or make a payment using a credit card, enter a social security number, etc.

At this point, the agent may inform the party that they will be connected to an IVR, and that the agent will not be able to discern the sensitive information provided by the party to the IVR. Then, the agent will conference in the IVR in operation 1315 using the secure three-way conference bridge discussed in FIG. 11 that automatically modifies or suppresses DTMF tones provided by the party.

The agent will monitor the interaction between the party and the IVR in operation 1320. Specifically, the agent is able to hear the IVR prompts unmodified, but will not be able to discern the party's DTMF responses. The party's responses will be modified—that is, the DTMF responses either be prevented from being heard by the agent (e.g., muted), or the party's DTMF responses will be altered so as to make the response unrecognizable.

The agent may focus on the IVR prompts, which are readily recognizable by the agent. The IVR will indicate whether a transaction was successfully or unsuccessfully completed. For example, after a credit card is provided and the payment transaction is completed, the IVR may confirm: "Thank you, your payment has been processed", or "We are sorry, but we could not process your payment." In other embodiments, the party may request help, and the IVR may state "Please stay on the line while an agent returns." The agent monitors the prompts in operation 1325 to determine if the transaction is completed or if help is required. If the transaction is not completed, and the party has not requested help, then the process loops back to operation 1320 where the agent continues to monitor the interaction.

Once the transaction is completed, the agent drops off the IVR from the conference in operation 1330. At this point, the agent may discuss further aspects with the party in operation 1335. Depending on the context, the agent may decide to re-conference the IVR by looping back to operation 1315, or the agent may terminate the call.

In other embodiments, the agent can provide assistance to the party without dropping the IVR at this point. The agent can communicate to the party, and hear the party's speech responses to the IVR prompts, and guide the user through the process of entering DTMF. If so, then the agent may only drop the IVR after the transaction has completed. However, when the agent and IVR are both joined with the party, it is possible the IVR may provide a prompt at the same time as the agent or remote party, and cause confusion.

The above process flow describes how the agent can invoke a conference function using a secure three-way bridge to join an IVR that provides prompts and collects responses comprising sensitive information. The secure three-way bridge prevents the agent from discerning sensitive information. A recording of the call will include the same audio presented to the agent, which would include the modified sensitive information. This allows the recording to be reviewed, but without compromising the sensitive information.

The process 1300 of FIG. 13 has an advantage in that it does not modify existing IVRs or recording systems. It requires only the use of the secure three-way conference bridge in the VoIP based telephony switch in the contact center call handler.

Figure 13B:
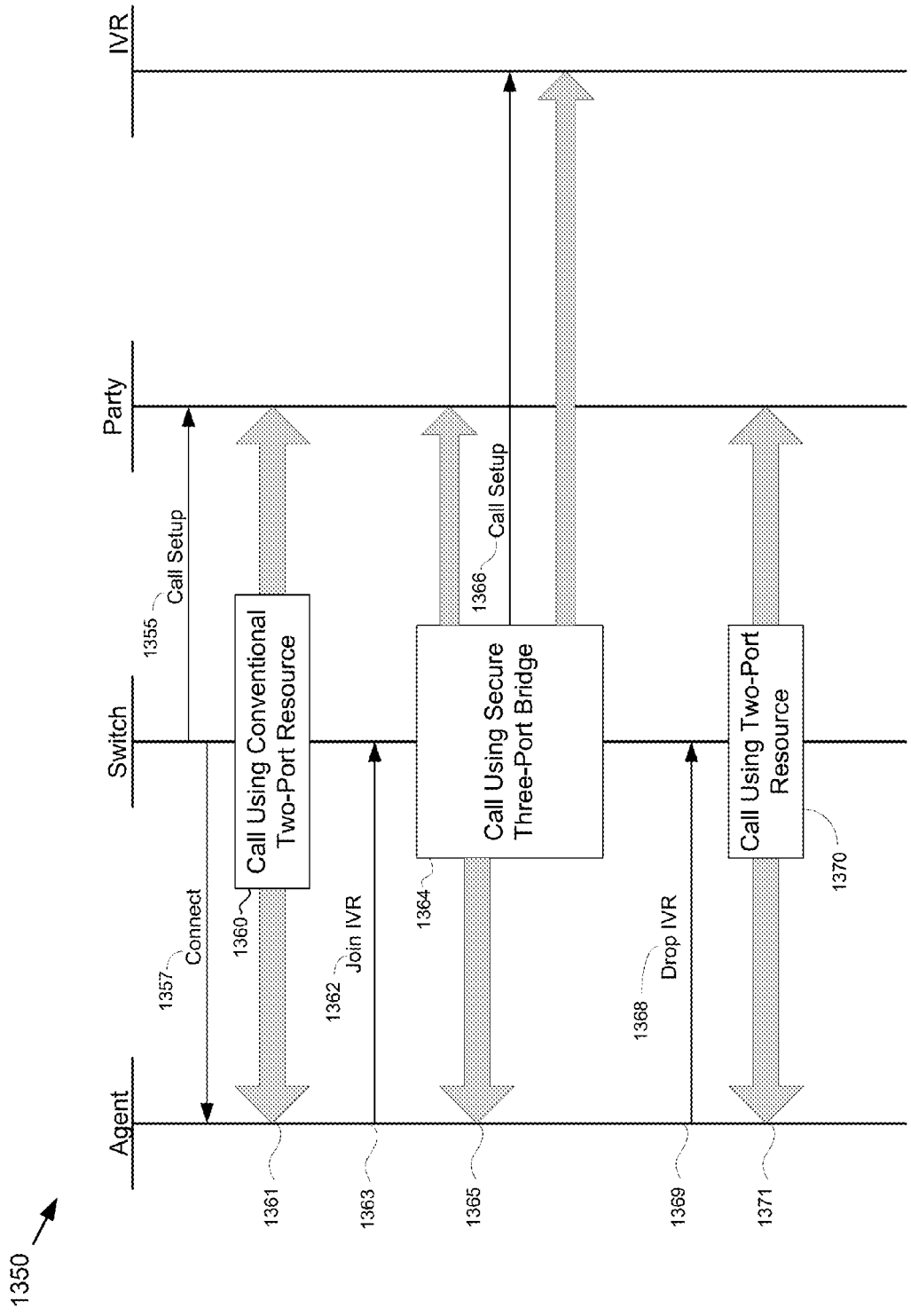
FIG. 13B illustrates a message flow associated with using a secure three-way bridge.

A corresponding messaging diagram 1350 of the process flow is shown in FIG. 13B. The message flow shows the interactions between the agent (i.e., agent's workstation), switch (located in the call handler), party, and the IVR (which may be incorporated into a payment processing system that is local to the contact center or remote and third-party controlled). In this illustration, the outbound call center originates calls to called remote party. Thus, a call setup message 1355 occurs between the switch and the called party. Next, the switch sends a connect message 1357 to the agent. At this point in time 1361, the call is established between the agent and the party using a conventional switching two-port resource 1360.

At a subsequent point in time 1363, a need arises for the party to provide sensitive information, which requires the party to interact with an IVR to provide DTMF. To accomplish this, the agent initiates a conference call using a secure three-way bridge resource in the switch. This moves the call between the agent and the party from the two-port resource to the secure three-way bridge resource 1364. A call leg is established to the IVR using a call setup message 1366. Once completed, a separate call leg is completed between the switch and the IVR.

At this point in time 1365, the secure three-port bridge operates as described above. After the IVR acknowledges the transaction is completed, the agent may decide at time 1369 to drop the IVR form the call using appropriate messaging 1368 to the switch. This results in the call returning to a two-port resource 1370 at time 1371.

FIGS. 14A-C and 15

FIGS. 14A and 14B illustrate another embodiment of a secure three-way bridge. This is illustrated in FIG. 14A as using a modified form of a splitter, illustrated as a secure splitter 1400 (distinguished from a regular splitter by the tilde symbol incorporated therein), which comprises the input leg 705, and two output legs 710, 715. The node is shown as a modified node 1405 that incorporates functionality for selectively modifying DTMF input so as to suppress or modify sensitive information on one output of the splitter. The modified splitter 1400 is incorporated into a three-way bridge 1407 as shown in FIG. 14B.

Turning to the architecture 1450 of FIG. 14B, the secure three-way bridge 1407 comprises the modified node 1405 receiving audio from the party via channel 202. The audio (including DTMF tones) is provided unmodified on channel 206a, 206 to the IVR 156. Any audio comprising DTMF tones are modified and then provided to output leg 860 which is provided to channel 214 to the agent. Any non-DTMF tones are not modified by the node 1405 and the audio is provided to both outputs.

FIG. 14C illustrates the secure three-way bridge 1407 of FIG. 14B in a slightly modified form, so as to allow easy identification of the splitters, combiners, and with their respective inputs/outputs labeled. Specifically, the secure splitter 1400 is shown interconnected to another splitter 1486 and combiner #2 1488 and combiner #3 1482, and wherein combiner #1 1484 is also interconnected to splitter #1 1486 and splitter #2 1490.

Figure 15:
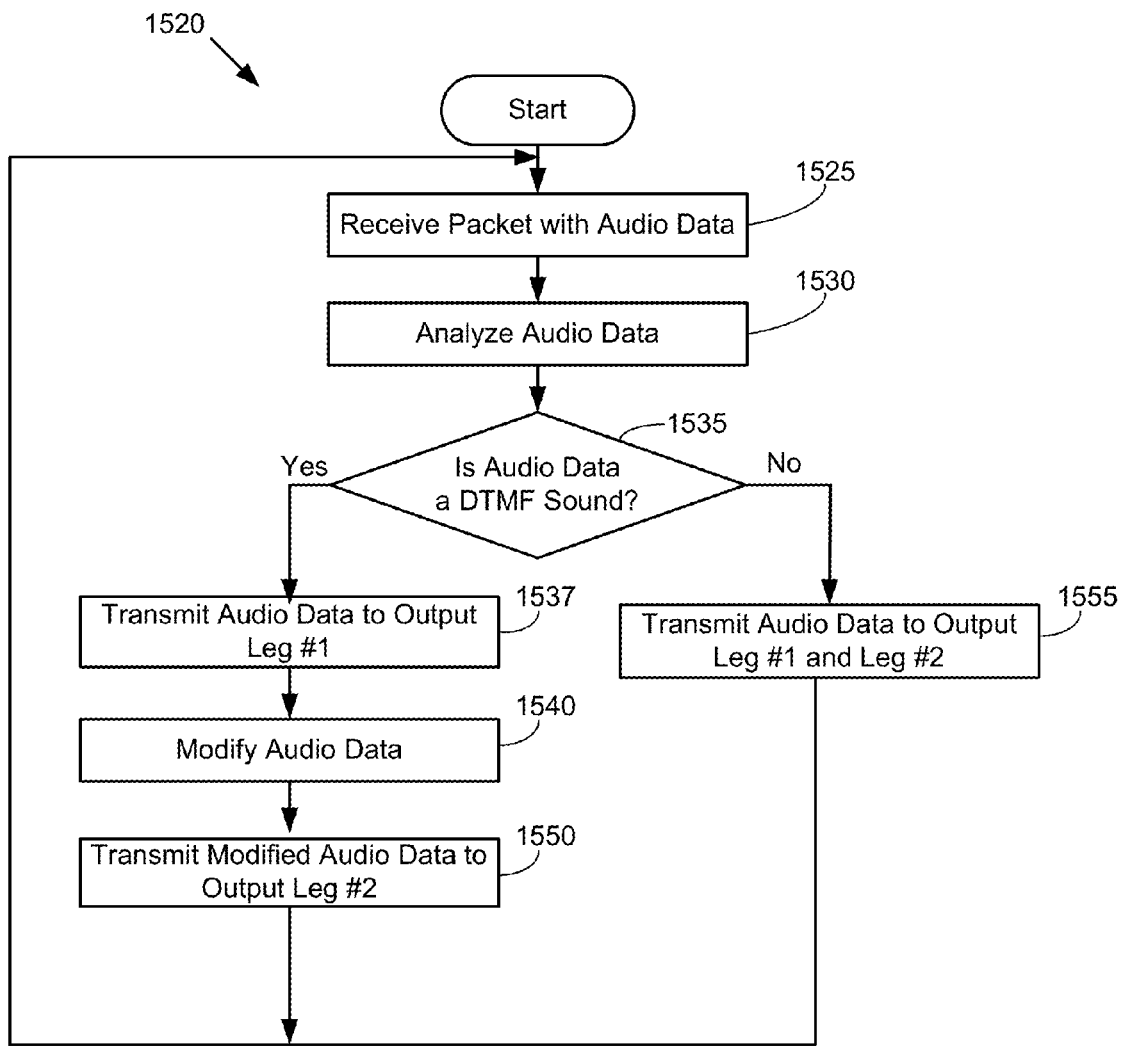
FIG. 15 illustrates a process flow for the embodiment of a secure three-way bridge.

The secure-three-way bridge can be implemented in a VoIP-based environment using SIP where the switch processes digitized voice packets, and wherein DTMF tones are conveyed as audio data within the packet, similar to voice packets. A process flow for the processing device to implement the secure three-way bridge is shown in FIG. 15. Turning to FIG. 15, the process 1520 is iterative, and begins with receiving a packet of digitized audio in operation 1525. Upon receiving the audio packet, the data is analyzed in operation 1530. Specifically, the data is analyzed to distinguish between DTMF and non-DTMF (e.g., voice) audio. DTMF tones are defined to include certain frequencies, and these can be readily distinguished from voice. The DTMF audio data will be largely consistent with a digital pattern corresponding to one of twelve DTMF tones that the party can enter. The audio data can be easily checked against a table of patterns stored in a memory to determine if the audio data is a DTMF tone. Other mechanisms can be employed by those skilled in the art to determine whether the digital audio data is a DTMF tone. If the audio does not contain DTMF in operation 1535, then the audio data in the packet is presumed to be voice and is provided to both output legs #1 and #2. In essence, the packetized audio data is copied as unmodified audio data provided on the output legs. Thus, speech from the party is forwarded unmodified to the IVR and the agent.

If the audio data is determined to include DTMF in operation 1535, then this is likely because the party is responding to a prompt for information provided by the IVR. It can be presumed that the information provided is sensitive information, so any DTMF response provided by the party is treated as sensitive information. In this case, the audio data is transmitted to output leg #1 unmodified in operation 1537. This unmodified audio data would go to the IVR. Next, the audio data representing the DTMF tones are modified in operation 1540. The form of the modification may vary. In one embodiment, the data is 'zeroed-out', which effectively mutes the audio. In another embodiment, the audio data is modified by setting it to a random value for the duration of the DTMF tone, which effectively generates noise. In another embodiment, audio data comprising a different DTMF tone is added to the audio data, which effectively combines another DTMF tone to the party's provided DTMF tone. In another embodiment, each DTMF tone is replaced with the same single DTMF value for each instance.

The modified audio data is then provided as packets to output port #2 in operation 1550. Thus, the modified audio data is provided to the agent, which hears the modified audio. If the modified audio is based on removing the DTMF tone, then the agent will not hear anything, or will not be able to identify it if the party even responded to the IVR prompt. Thus, in many embodiments, it is desirable that the agent is aware of the party responding to the prompt and so modified audio data is generated by modifying the audio tone to add a tone or replace each DTMF tone with the same single DTMF tone. In this way, the agent is able to discern whether the party responded to the IVR prompt or not, but is unable to discern what key the party pressed. The process then loops back to operation 1525 where the next audio data packet is processed.

This embodiment avoids the use of any specialized hardware detectors, and allows a processor executing program code to route and process audio packets so that sensitive DTMF information is not forwarded to the agent. The process flow effectively implements the secure splitter previously discussed.

SIP Based Embodiment

The embodiments discussed above for providing a secure three-way bridge can be used with various technologies that provide digitized audio packets for voice and DTMF tones. This would include using industry standards for VoIP that use SIP as a standard signaling protocol. The SIP framework allows DTMF tones to be conveyed in various ways.

In one approach, the DTMF tones, when received from a source providing them as in-band tones, can be conveyed in-band as digitized tones. In other words, the DTMF tones are digitized and processed similar to voice or any other audio data. This requires a high quality codec, such as G.711, to convey all the information in the DTMF tones. In many applications, however, other codecs may be used in the conveyance of the audio packets that do not convey all the frequencies of DTMF. These codecs are optimized for voice, and DTMF tones frequently are degraded as they pass through these codecs.

In another approach, incoming DTMF tones are converted to specially indicated Real Time Protocol ("RTP") packets in SIP. The RTP packets convey digitized voice and other forms of media and certain named events, including certain ones defined for conveying DTMF. Further information is found in the Internet Engineering Task Force Request for Comments RFC 2833 and also RFC 4733.

RTP packets are conveyed on a "best attempt" basis. The rationale is that if a voice packet is occasionally lost, the meaning of the conversation can be maintained, and hence developing a reliable mechanism for transferring RTP packets is not worth the processing overhead. However, because, in part, of this concern, another approach for conveying DTMF packets was developed, and this approach uses SIP INFO signaling packets to convey DTMF.

Using RTP or SIP INFO packets is an out-of-band transfer of DTMF, which means the DTMF is conveyed logically separate from the stream of digitized voice audio. Nevertheless, a SIP INFO packet conveying DTMF information is considered a packet that conveys audio information. At a gateway or other device receiving in-band DTMF tones (such as from a telephone network), these out-of-band packets conveying DTMF tones may processed in several ways.

First, the in-band DTMF tone is converted to an in-band digitized packet that is included in the digitized audio stream. This requires the use of high quality codecs that are able to pass all the frequencies in the DTMF tones. Any of the above embodiments of the secure three-way bridge discussed can be readily adapted to handle in-band DTMF conveyance.

A second approach for conveying DTMF tones is to provide the DTMF information in-band as discussed above, but also convey the DTFM information using the out-of-band RTP packet. This means that the receiving entity will receive DTMF related information both in-band and out-of-band. This allows use of codecs which do not pass all the frequencies in the DTMF in-band information, since the information is available in the out-of-band DTMF encoded packets. However, issues frequently arise due to the duplicative reception of DTMF information at the receiving entity. That is, it will receive DTMF information in-band and out-of-band.

To avoid this problem, and second way of conveying DTMF tones is to block its inclusion as in-band packets and provide DTMF information only as out-of-band information.

This can be accomplished using either the RTP packets or SIP INFO messages. In this approach, a gateway receiving conventional DTMF tones in-band with digitized voice (e.g., from a TDM network or PBX) will detect the DTMF packets, extract it from the stream of digitized packets, and transmit the corresponding out-of-band packet conveying the DTMF information. The audio data that is sent (e.g., the packets containing the digitized voice) does not include any DTMF tone data.

Figure 16A:
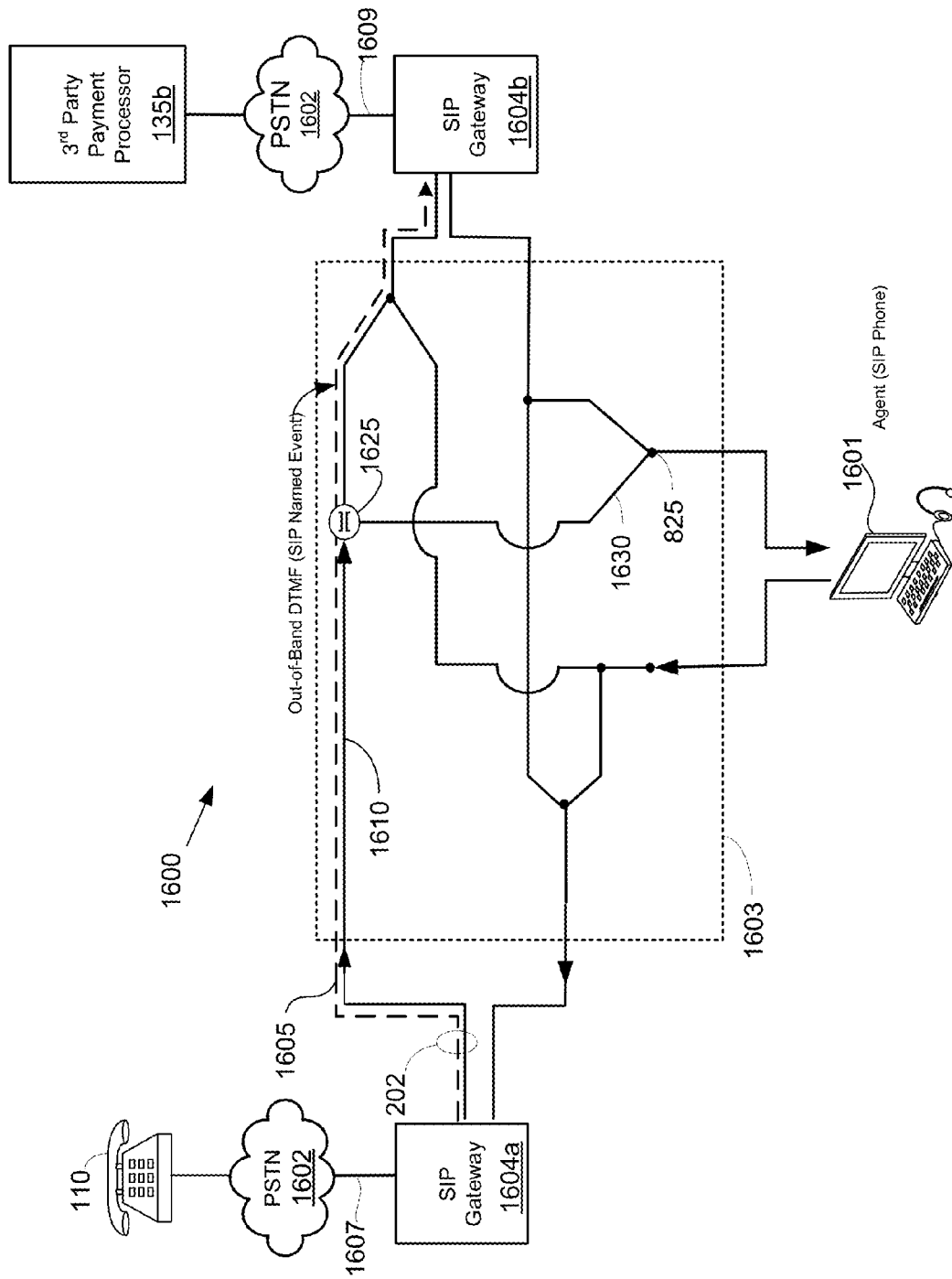
FIGS. 16A-16C illustrate various embodiments based on using SIP signaling.

If the DTMF tones are conveyed out-of-band, then different functionality is required in the secure three-way bridge node. Namely, the secure splitter must incorporate an out-of-band DTMF filter ("OOB DTMF Filter") node is required to detect the out-of-band DTMF packets and selectively forward them or block them. This architecture for use of the OOB DTMF Filter is illustrated in FIG. 16A. Turning to FIG. 16A, the architecture 1600 involves a user at a conventional analog phone 110 initiating a call to a contact center represent by the agent's SIP phone 1601. The agent has bridged on a third-party payment processor 135b that includes IVR functionality.

The call from the user is handled by the PSTN 1602 which routes the call over facilities 1607 to a SIP gateway 1604a. The SIP gateway 1604a receives the voice and DTMF tones and interworks these according to the applicable VoIP standard. Assuming that SIP is being used, the channel 202 conveys in an out-of-band RTP name event packet 1605, so that they are distinct from the voice packets 1610. The out-of-band packets 1605 and the voice packets 1610 arrive at a secure three-way bridge comprising the OOB DTMF Filter node 1625 (distinguished from other embodiments of secure three-way bridges that do not comprise the OOB DTMF Filter by the inclusion of a symbol shown in the node 1625).

The OOB DTMF Filter node 1625 blocks the out-of-band digitized DTMF packets from being conveyed to node 825 using leg 1630. The OOB DTMF Filter passes the DTMF packets to the SIP gateway 1604b. In this manner, the DTMF information is not provided to the agent, but is provided to the SIP gateway 1604b.

At the SIP gateway 1604b, the DTMF out-of-band packets are received, as well are the packetized voice. The SIP gateway 1604b can generate in-band DTMF tones over facility 1609 to the PSTN 1602, which are conveyed to the third party payment processor 135b. Thus, the third party payment processor is able to receive in-band DTMF tones in the manner it expects and is able to process.

The secure three-way bridge that incorporates a SIP-based OOB DTMF Filter allows DTMF information to be suppressed to the agent, but transmitted to the IVR. The agent, in this embodiment, does not hear any of the DTMF tones entered by the caller because they are filtered. In another embodiment, the node 1625 could modify the DTMF packets and allow, e.g., a fixed value DTMF packet to be conveyed to node 825, and then to the agent's SIP phone 1601. The agent would then hear a corresponding, single-value, pre-defined DTMF tone whenever the party entered a DTMF value.

Figure 16B:
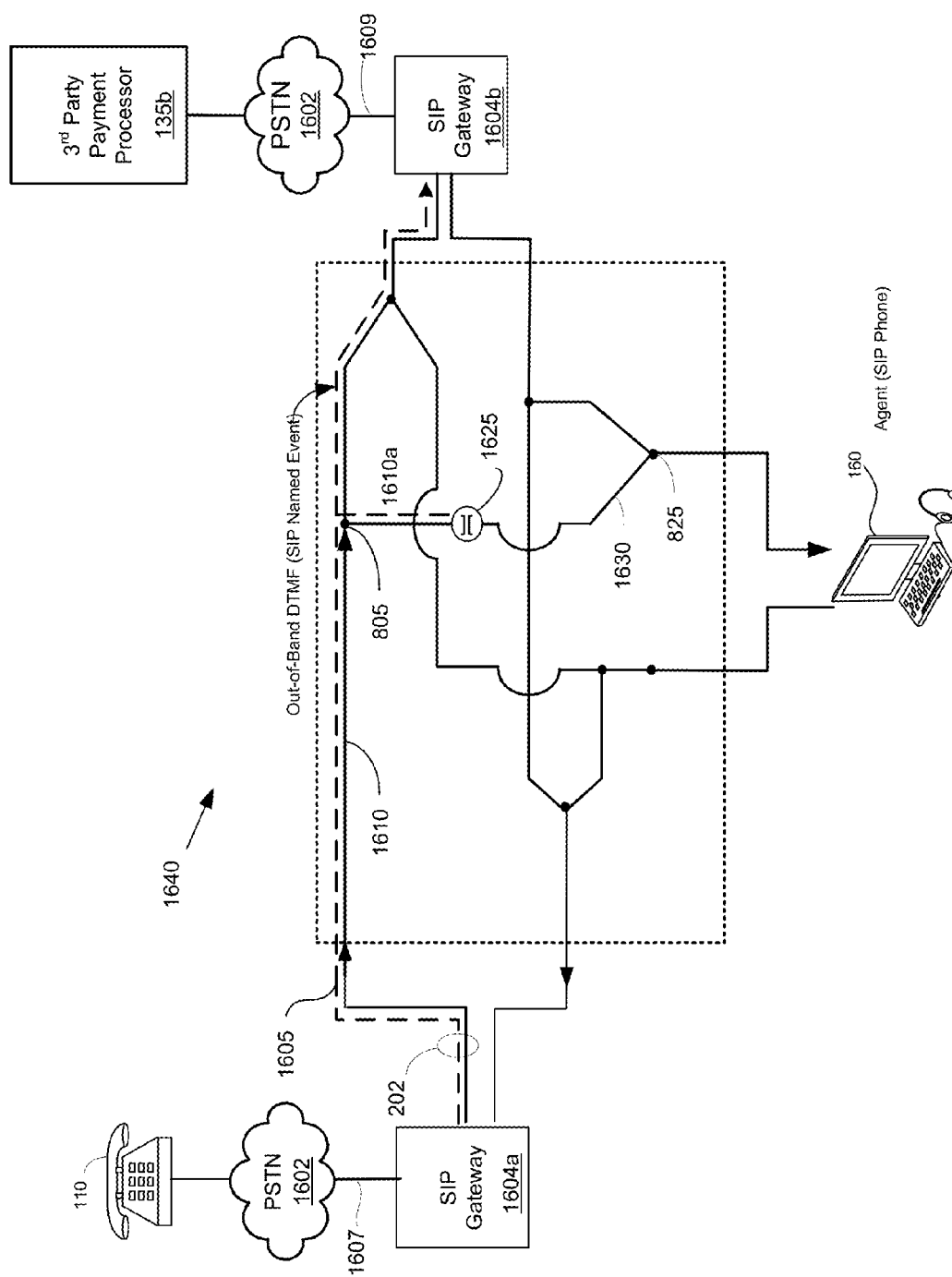

Similar to previously disclosed embodiments, the functionality of filtering the OOB DTMF packets can be accomplished in various ways. Turning to FIG. 16B, this discloses an architecture 1640 in which the functionality of node 1625 is located after the node 805 of the splitter. Thus, the node 805 copies all the out-of-band DTMF packets 1610a to the node 1625, at which point they may be discarded or modified. The rest of the components operated as described above.

Figure 16C:
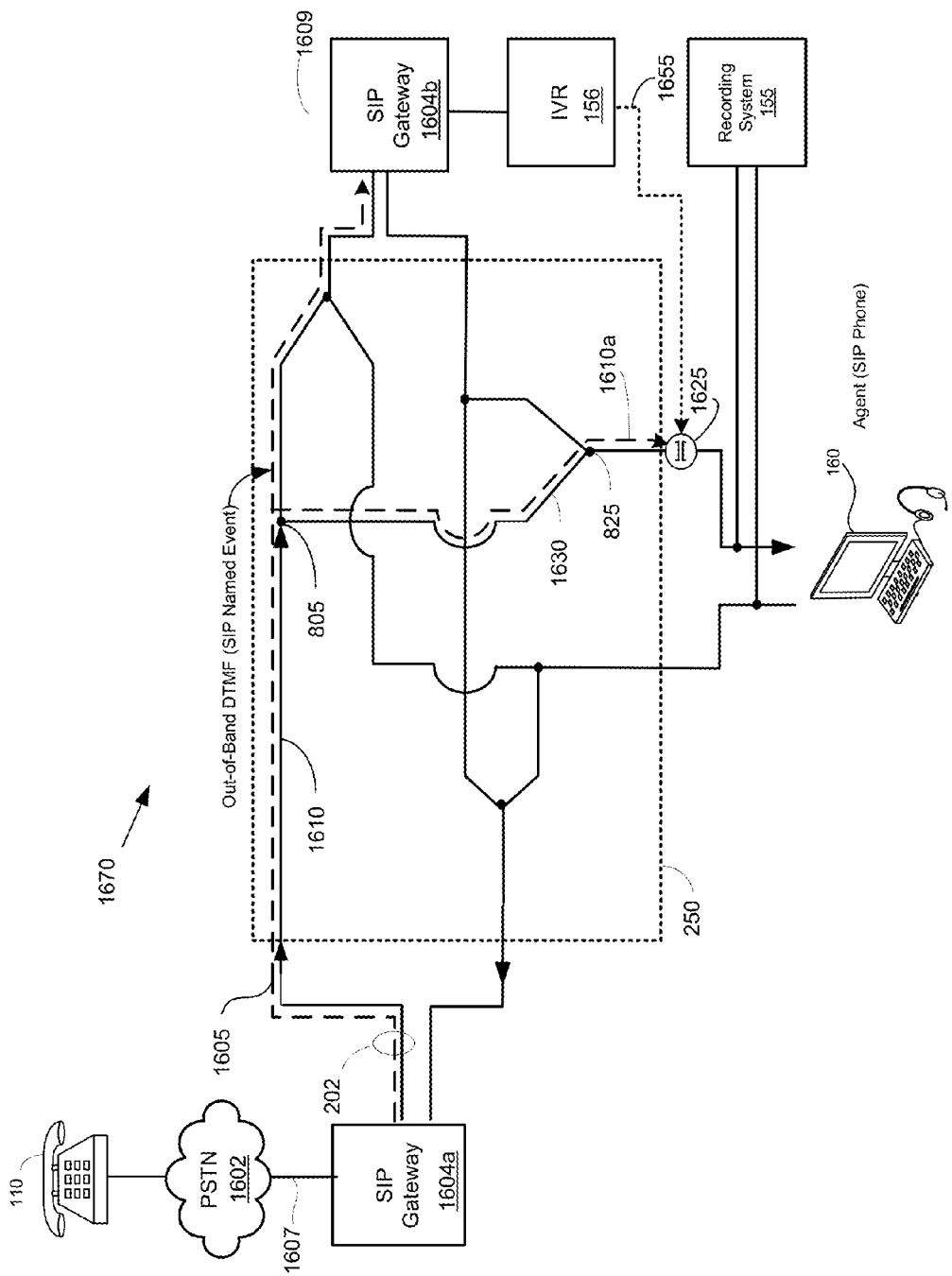

FIG. 16C discloses another architecture 1670 in which the node 1625 is located outside the three-way bridge 250. In this case the leg 1610a extends beyond the three-way bridge 250, which reflects processing of the DTMF packets external from the processing of the packets to effect the three-way bridge function. Placement of the recording system 155 at the points shown allow the information to be recorded without comprising the sensitive information. Note that this architecture presumes the recording system is VoIP compatible.

In FIG. 16C, the IVR 156 may control the node 1625 based on a signaling link 1655. The signaling link may indicate when the node 1625 is activated to block, modify, or otherwise process the out-of-band signaling packets.

Other Variations

In the various embodiments disclosed above, the modification of the DTMF information could involve encryption of the DTMF information. That is, the modification of the DTMF information could be based on encryption of the data representing the DTMF tone. This could be accomplished using any number of well known encryption techniques, and this would also be effective to prevent sensitive information from being comprehended or recognized by the agent. Recording the call would result in recording the encrypted information, and subsequent playback would not expose the sensitive information to the listener. The sensitive information could only be disclosed if the appropriate key is available to decrypt the encrypted information prior to regenerating the audio.

Figure 3:
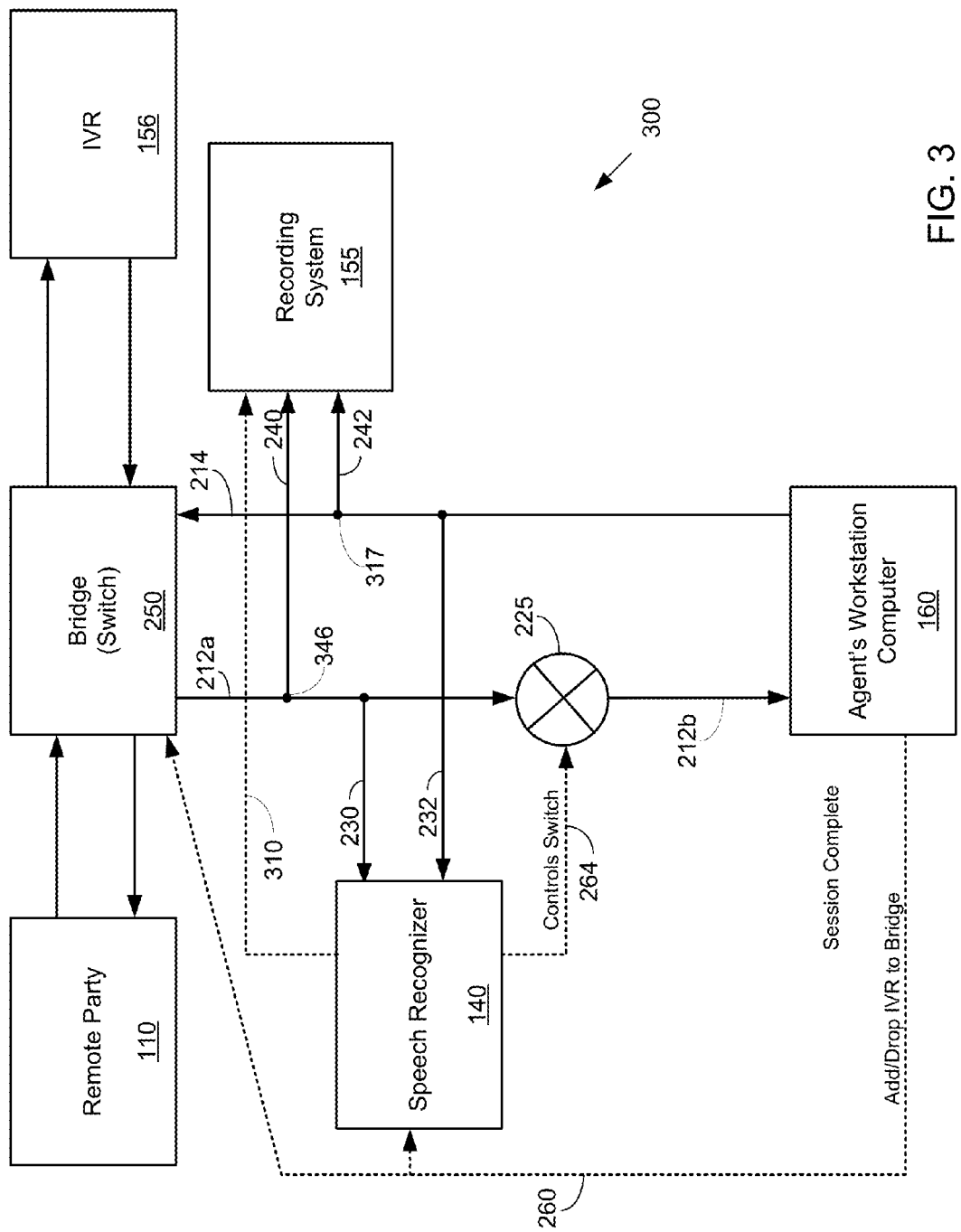

In other embodiments, the triggering of:
the switch 225 of FIGS. 2B and 3,
the mixer 505 of FIG. 5,
the DSP 615 of FIG. 6,
the switch 925 of FIGS. 9, 10, and 11,
the DSP 1205 of FIG. 12,
the secure splitter 1405 of FIG. 14B, or
the filter 1625 of FIG. 16A-C,
could have been modified to occur in an application specific context. For example, rather than muting or modifying any DTMF provided by the remote party, application specific logic could have been defined to initiate the trigger to mute or modify a limited number of discrete DTMF digits. Thus, in the context of receiving a social security that includes nine digits, the triggering could be set to mute or modify the first eight digits. Any extraneous digits entered would not be muted or modified. Similarly, if a credit card account is entered, a fixed number of DTMF digits would be muted or blocked. The appropriate number of digits is dependent on the application.

In another embodiment, the triggering could be disabled or enabled on a session level that is associated with how the secure three-way bridge was invoked as a resource. For example, returning to FIG. 16A, the secure three-way bridge 1603 can be invoked by the agent when necessary to bridge on an IVR onto an existing call. The three-way bridge can be defined as a resource that is called when needed. Further, a parameter or flag included when requesting the three-way bridge can indicate whether a conventional three-way bridge is required or a secure three-way bridge is required. In essence, this parameter would indicate whether the OOB DTMF Filter node 1625 is enabled or if a conventional splitter is used. If enabled, then it is able to filter out DTMF so that the DTMF is sent only on one output leg (to the joined party). If the OOB DTMF Filter node 1625 is disabled, then DTMF information is copied to both outputs of the splitter. In essence, once the OOB DTMF Filter node 1625 is disabled, the bridge 1603 functions as a conventional SIP bridge, similar to that shown in FIG. 8. This allows applications that do not require a secure three-way bridge to request the bridge as a resource. Thus, an agent that needs to bridge a caller with an IVR where sensitive information is not conveyed can do so using a conventional bridge. If, however, sensitive information is conveyed, the agent can request a secure three-way bridge to be used.

The bridge can be defined as a resource that is callable in a hosted switching platform, in a PBX, or call handler located in the premises of a contact center. Other deployment configurations are readily possible.

Exemplary Processing Device Architecture

As discussed in conjunction with FIG. 1, the contact center architecture 100 may comprise various components that comprise a processing system. FIG. 17 is an exemplary schematic diagram of a processing system 1700 that may be used in an embodiment to practice the technologies disclosed herein. Specifically, this could be implemented as a software module executing in the computer of the agent's workstation. In general, the term "processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein.

As shown in FIG. 17, the processing system 1700 may include one or more processors 1701 that may communicate with other elements within the processing system 1700 via a bus 1705. The processor 1701 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing system 1700 may also include one or more communications interfaces 1702 for communicating data via the local network with various external devices, such as other components of FIG. 1. In other embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 1703 may also communicate with one or more input devices or peripherals using an interface 1704, such as, but not limited to: a keyboard, a mouse, a touch screen/display input, microphone, pointing device, etc. The input/output controller 1703 may also communicate with output devices or peripherals, such as displays, printers, speakers, headsets, banner displays, etc.

The processor 1701 may be configured to execute instructions stored in volatile memory 1706, non-volatile memory 1707, or other forms of computer-readable storage media accessible to the processor 1701. The volatile memory 1706 may comprise various types of memory technologies, including, but not limited to: random access memory ("RAM"), dynamic random access memory ("DRAM"), static random access memory ("SRAM"), and other forms well known to those skilled in the art. The non-volatile memory 1707 may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 1707 may store program code and data, which also may be loaded into the volatile memory 1706 at execution time. Specifically, the non-volatile memory 1707 may store one or more computer program modules, such as a secure conference bridge module 1709, and related data 1710, and/or operating system code 1708 containing instructions for performing the process and/or functions associated with the technologies disclosed herein. In addition, the secure conference bridge module 1709 generates or accesses the data 1710 in the non-volatile memory 1707, as well as in the volatile memory 1706. The volatile memory 1706 and/or non-volatile memory 1707 may be used to store other information including, but not limited to: records, applications, programs, scripts, source code, object code, byte code, compiled code, interpreted code, machine code, executable instructions, or the like. These may be executed or processed by, for example, the processor 1701. These may form a part of, or may interact with, the secure conference bridge module 1709 and/or event data 1710.

The technologies described herein may be implemented in various ways, including as computer program products comprising memory storing instructions causing a processor to perform the operations associated with the above technologies. The computer program product may comprise a tangible non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such tangible, non-transitory computer readable storage media include all the above identified media (including volatile and non-volatile media), but does not include a transitory, propagating signal. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer-readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A session initiated protocol-based ("SIP-based") switching system comprising a processor for providing a secure three-way bridge for processing dual-tone multiple frequency ("DTMF") information associated with a call involving a remote party, an agent in a contact center, and an interactive voice response unit ("IVR"), the processor configured to:
   receive a digitized voice packet originating from the remote party at a first input of the secure three-way bridge;

provide the digitized voice packet to the agent via a first output of the secure three-way bridge and to the IVR via a second output of the secure three-way bridge;

receive a SIP-based real-time protocol ("RTP") telephone-event packet at the secure three-way bridge conveying out-of-band DTMF information originating from the remote party;

provide the out-of-band DTMF information to the IVR by providing the SIP-based RTP telephone-event packet to the IVR via the second output of the secure three-way bridge; and filter the out-of-band DTMF information from being provided by the secure three-way bridge to the agent via the first output of the secure three-way bridge.

2. The SIP-based switching system of claim 1, wherein the step of filtering the out-of-band DTMF information from being provided by the secure three-way bridge to the agent comprises:

substituting a pre-defined DTMF information for the out-of-band DTMF information and providing the pre-defined DTMF information to the agent via the first output of the secure three-way bridge.

3. The SIP-based switching system of claim 2, wherein providing the pre-defined DTMF information to the agent via the first output of the secure three-way bridge uses the SIP-based RTP telephone-event packet.

4. The SIP-based switching system of claim 2, wherein the out-of-band DTMF information represents a credit card account.

5. The SIP-based switching system of claim 4, wherein the SIP-based switching system is a component in a call handler, and the processor is further configured to receive a request from the agent to use the secure three-way bridge to bridge on the IVR to the call involving the remote party.

6. The SIP-based switching system of claim 1, wherein the step of filtering the out-of-band DTMF information from being provided to the agent via the first output of the secure three-way bridge to the agent comprises:

blocking the out-of-band DTMF information by the processor from being provided to the agent via the first output of the secure three-way bridge.

7. A session initiated protocol-based ("SIP-based") switching system for providing a secure three-way bridge for conferencing sensitive information on a call involving a party, an agent in a contact center, and an interactive voice response unit ("IVR"), the SIP-based switching system comprising a processor configured to:

receive at an input channel of the secure three-way bridge a packet representing audio data originating from the party;

analyze the audio data to ascertain if the audio data represents a dual-tone multiple frequency ("DTMF") tone conveyed in-band to the secure three-way bridge;

provide the audio data to both a first output port and a second output port in response to determining the audio data does not represent the DTMF tone; and in response to determining the audio data does represent the DTMF tone, a) provide the audio data to the first output port, b) modify the audio data to generate modified audio data, and c) provide the modified audio data to the second output port, wherein output from the first output port is routed to the IVR and output from the second output port is routed to an agent workstation of the agent in the contact center.

8. The SIP-based switching system of claim 7, further comprising:

a recording system configured to record both the modified audio data and the audio data provided by the second output port.

9. The SIP-based switching system of claim 7, wherein the step of modifying the audio data comprises:

substituting pre-defined audio data representing a pre-defined DTMF tone for the audio data representing the DTMF tone.

10. The SIP-based switching system of claim 7, wherein the audio data representing the DTMF tone corresponds to a digit of a credit card account of the party.

11. The SIP-based switching system of claim 7, wherein the SIP-based switching system is a component in a call handler of the contact center, and the agent invokes the secure three-way bridge to conference the IVR onto the call.

12. The SIP-based switching system of claim 7, wherein the secure three-way bridge provides audio data of a prompt provided by the IVR to both the party and the agent.

13. The SIP-based switching system of claim 7 wherein the processor is further configurable to provide the secure three-way bridge for conferencing non-sensitive information so that all audio data packets comprising DTMF information and non-DTMF information provided by the agent to the secure three-way bridge are provided to the party and the IVR.

14. A call center system comprising a session initiated protocol-based ("SIP-based") switch comprising a secure three-way bridge for joining an interactive voice response unit ("IVR") onto a call involving an agent in a call center and a party, the switch further comprising a processor configured to process digitized audio by executing instructions effecting:

a first splitter module and a second splitter module, wherein each splitter module is configured to receive audio comprising a digitized audio packet as a splitter input and provide the digitized audio packet to both the first splitter output and the second splitter output;

a secure splitter module, wherein the secure splitter module is configured to receive an audio input and provide the audio input as a first output in an unmodified form, provide a modified audio as the second output of the secure splitter module if the audio input conveys dual-tone multiple frequency ("DTMF") information, and provide the audio input in an unmodified form as the second output of the secure splitter module if the audio input does not convey DTMF information; and a first combiner module, a second combiner module, and a third combiner module, wherein each combiner module is configured to receive a first digitized audio packet comprising first audio as a first input and a second digitized audio packet as second audio as a second input, and wherein the combiner provides an output comprising an output digitized audio packet conveying audio comprising the first audio of the first digitized voice packet conferenced with the second audio of the second digitized voice packet, wherein the input of the secure splitter module is configured to receive digitized audio from the party, the first output of the secure splitter module is provided as the first input of the third combiner module, and the second output of the secure splitter module is provided as the first input of the second combiner module, wherein the first combiner module is configured so that the output is provided to the party, the first input to the first combiner module receives the first output of the second splitter module, and the second input of the first combiner module is configured to receive the first output of the first splitter module, wherein the first splitter module is configured to receive audio data from the agent as the input of the first splitter module, and the second output of the first splitter module is provided to the second input of the third combiner module, wherein the second input of the second combiner module is configured to receive the second output of the second splitter module, and the output of the second combiner module is configured to be provided as audio data to the agent, wherein the third combiner module is configured to provide the output of the third combiner module to the IVR, and wherein the second splitter module is configured to receive audio data from the IVR on the input of the second splitter module.

15. The call center system of claim 14 wherein the instructions when executed:

cause the digitized audio from the party received as the audio input of the secure splitter module to be processed so that the digitized audio data from the party comprising DTMF information is provided unmodified as the first output of the secure splitter module and is provided as the modified audio as the second output of the secure splitter module.

16. The call center system of claim 14, wherein the modified audio comprises a single predetermined DTMF value.

17. The system of claim 14, wherein the instructions when executed by the processor:

cause audio data from the IVR received as the input to the second splitter module to be provided unmodified to the agent and the party.

18. The system of claim 14, wherein the instructions when executed by the processor:

cause the digitized audio received from the party comprising non-DTMF audio to be provided unmodified to the agent and the IVR.

19. The system of 14, further comprising:

a recording system configured to record audio data provided as the input to the first splitter module and audio data provided by the output of the second combiner module.

20. The system of claim 19, wherein audio provided by the party comprising DTMF to the secure three-way bridge is not provided to the agent.

* * * * *